(12) United States Patent
Tsuchiya

(10) Patent No.: US 10,084,957 B2
(45) Date of Patent: Sep. 25, 2018

(54) IMAGING APPARATUS WITH IMAGE COMPOSITION AND BLUR CORRECTION

(71) Applicant: OLYMPUS CORPORATION, Hachioji-shi, Tokyo (JP)

(72) Inventor: Hitoshi Tsuchiya, Hamura (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/248,323

(22) Filed: Aug. 26, 2016

(65) Prior Publication Data
US 2017/0064201 A1   Mar. 2, 2017

(30) Foreign Application Priority Data
Aug. 28, 2015 (JP) ................................. 2015-169370

(51) Int. Cl.
*H04N 5/232* (2006.01)
*H04N 5/235* (2006.01)

(52) U.S. Cl.
CPC ..... *H04N 5/23229* (2013.01); *H04N 5/23258* (2013.01); *H04N 5/23287* (2013.01); *H04N 5/2353* (2013.01); *H04N 5/2355* (2013.01)

(58) Field of Classification Search
CPC ............. H04N 5/2328; H04N 5/23287; H04N 5/23229; H04N 5/23258
See application file for complete search history.

(56) References Cited

U.S. PATENT DOCUMENTS

| | | | | |
|---|---|---|---|---|
| 7,978,222 B2* | 7/2011 | Schneider | ............... | G03B 17/00 348/208.1 |
| 8,310,563 B2* | 11/2012 | Yamashita | .......... | H04N 5/23238 348/239 |
| 9,843,724 B1* | 12/2017 | Brailovskiy | ....... | H04N 5/23238 |
| 2006/0061660 A1* | 3/2006 | Brackmann | .......... | H04N 5/2253 348/208.1 |
| 2009/0219402 A1* | 9/2009 | Schneider | ............... | G03B 17/00 348/208.7 |
| 2009/0284609 A1* | 11/2009 | Matsunaga | ........ | H04N 5/23248 348/208.12 |
| 2010/0295961 A1* | 11/2010 | Terauchi | ............ | H04N 5/23229 348/222.1 |

(Continued)

FOREIGN PATENT DOCUMENTS

JP        2000-224462 A       8/2000

*Primary Examiner* — Nicholas G Giles
(74) *Attorney, Agent, or Firm* — Volpe and Koenig, P.C.

(57) ABSTRACT

An image pickup apparatus includes: an image pickup device; a body portion; an attitude detection portion configured to detect an attitude of the body portion; an image stabilization portion configured to correct image blur; an image stabilization control portion configured to calculate an amount of correction for the image stabilization portion; and a control portion including an image processing portion configured to generate one piece of composite image data from a group of continuously picked-up images; wherein the image stabilization control portion sets a reference angle at a time of picking up image data picked up first in the group of continuously picked-up images, and drives the image stabilization portion so that the reference angle corresponds to inclination of each image at a time of picking up image data picked up for a second time and after.

2 Claims, 22 Drawing Sheets

WITH IMAGE
STABILIZATION ACTION

AT TIME OF PICKING UP IMAGE I

AT TIME OF PICKING UP IMAGE II

AT TIME OF PICKING UP IMAGE III

(56) References Cited

U.S. PATENT DOCUMENTS

| | | | | |
|---|---|---|---|---|
| 2011/0141228 A1* | 6/2011 | Shimada | G03B 37/00 | |
| | | | 348/36 | |
| 2013/0107064 A1* | 5/2013 | Venkatraman | H04N 5/23258 | |
| | | | 348/208.2 | |
| 2013/0107066 A1* | 5/2013 | Venkatraman | H04N 5/23248 | |
| | | | 348/208.4 | |
| 2014/0009631 A1* | 1/2014 | Topliss | G02B 27/646 | |
| | | | 348/208.11 | |
| 2014/0125825 A1* | 5/2014 | Baer | H04N 5/23277 | |
| | | | 348/208.5 | |
| 2014/0320680 A1* | 10/2014 | Shibata | H04N 5/23261 | |
| | | | 348/208.3 | |
| 2014/0362256 A1* | 12/2014 | Schulze | H04N 5/23277 | |
| | | | 348/231.99 | |
| 2016/0127646 A1* | 5/2016 | Osborne | H04N 5/2251 | |
| | | | 348/208.2 | |
| 2016/0198088 A1* | 7/2016 | Wang | H04N 5/23238 | |
| | | | 348/36 | |
| 2016/0212332 A1* | 7/2016 | Tang | H04N 5/23232 | |

* cited by examiner

IMAGING APPARATUS WITH IMAGE COMPOSITION AND BLUR CORRECTION

CROSS REFERENCE TO RELATED APPLICATION

This application claims the benefit of Japanese Application No. 2015-169370 filed in Japan on Aug. 28, 2015, the contents of which are incorporated herein by this reference.

BACKGROUND OF INVENTION

1. Field of the Invention

The present invention relates to an image pickup apparatus which combines a plurality of pieces of image data continuously picked up to generate one piece of composite image data.

2. Description of the Related Art

As an image pickup apparatus such as a digital camera, an image pickup apparatus which includes an image stabilization portion configured to correct an image blur caused by change in an attitude of the image pickup apparatus is known. For example, Japanese Patent Application Laid-Open Publication No. 2000-224462 discloses an image pickup apparatus including an attitude detection portion configured to detect change in an attitude of the image pickup apparatus, and an image stabilization portion configured to cause an image pickup device to move according to the change in the attitude of the image pickup apparatus detected by the attitude detection portion.

Further, as an image pickup apparatus such as a digital camera, an image pickup apparatus which includes an image processing portion configured to combine a plurality of pieces of image data obtained by continuous image pickup to generate one piece of image data. As a photographing technique for combining a plurality of pieces of image data continuously picked up to obtain one piece of image data, for example, camera shake reduction photographing, HDR (high-dynamic-range) image pickup or panorama photographing is given. For example, in the camera shake reduction photographing, by acquiring a plurality of pieces of image data by performing continuous photographing at such a shutter speed that camera shake is difficult to occur and making an additive synthesis of the plurality of pieces of image data, composite image data without an image blur and with appropriate exposure is obtained.

SUMMARY OF THE INVENTION

An image pickup apparatus of an aspect of the present invention includes: an image pickup device arranged on an optical axis of an image pickup lens; a body portion configured to accommodate the image pickup device; an attitude detection portion configured to detect an attitude of the body portion; an image stabilization portion configured to correct image blur caused by rotation of the body portion around the optical axis; an image stabilization control portion configured to calculate an amount of correction for the image stabilization portion according to a detection result of the attitude detection portion; and a control portion including an image processing portion configured to generate one piece of composite image data from a group of continuously picked-up images constituted by a plurality of pieces of image data continuously picked up by the image pickup device; wherein the image stabilization control portion sets a reference angle based on an attitude direction detected by the attitude detection portion at a time of picking up image data picked up first in the group of continuously picked-up images, and drives the image stabilization portion so that the reference angle corresponds to inclination of each image at a time of picking up image data picked up for a second time and after.

DETAILED DESCRIPTION OF THE PREFERRED EMBODIMENT(S)

Figure 1:
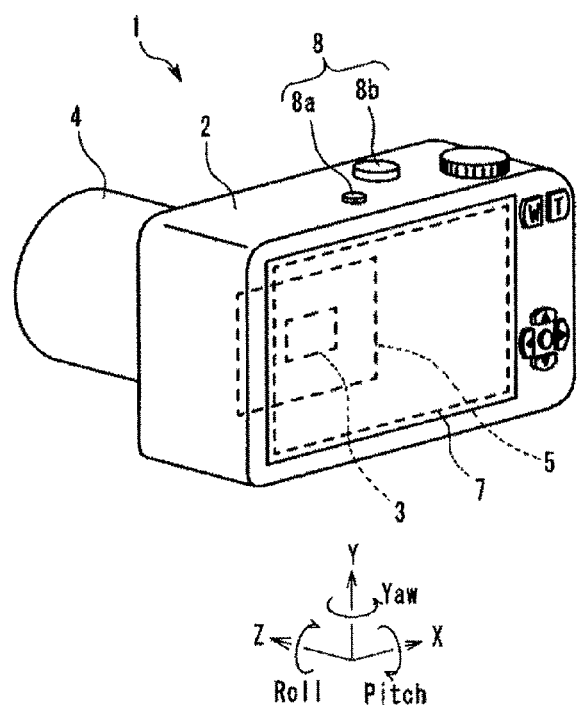
FIG. 1 is an external view illustrating a configuration of an image pickup apparatus of a first embodiment.

Preferred embodiments of the present invention will be described below with reference to drawings. Note that, in each of figures used in description below, reduced scale is caused to differ for each component so that each component is to be of a size recognizable on the drawing, and the present invention is not limited only to the number of components shown in the figures, shapes of the components, a ratio of sizes of the components, relative positional relationship among the respective components.

(First Embodiment)

Figure 2:
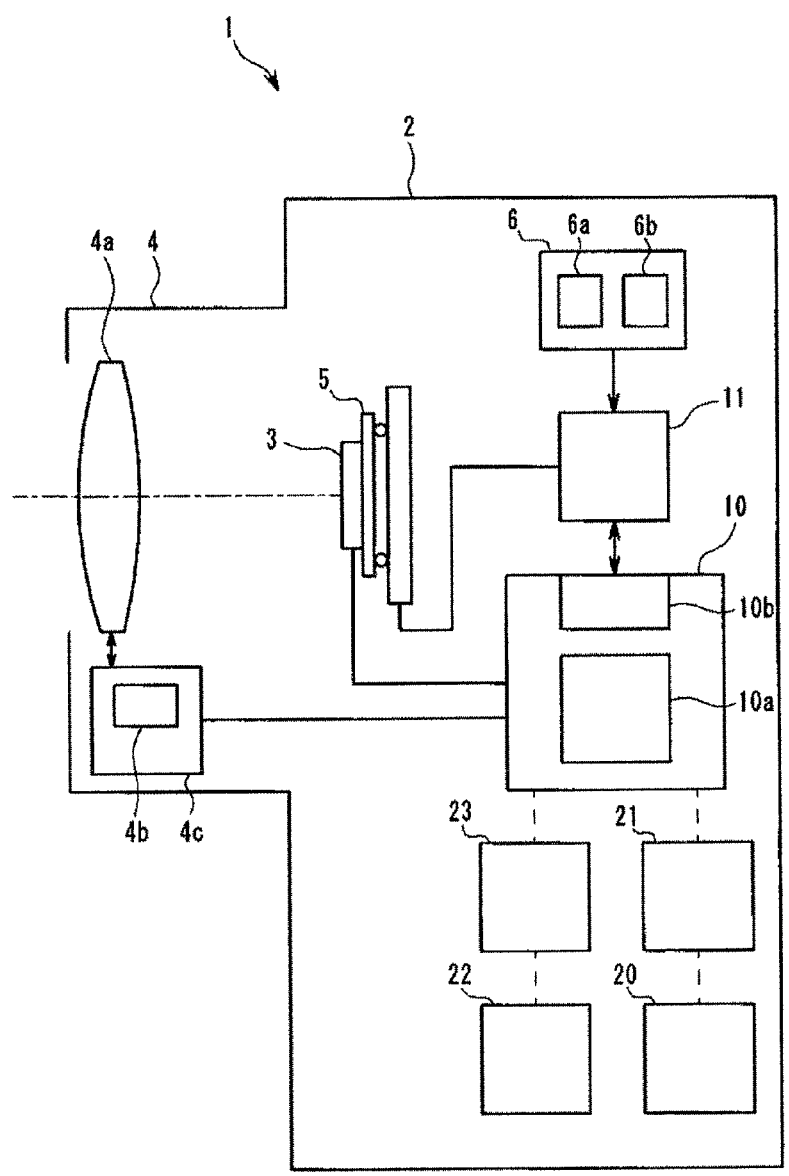
FIG. 2 is a block diagram illustrating the configuration of the image pickup apparatus of the first embodiment.

As shown in FIGS. 1 and 2, an image pickup apparatus 1 of the present embodiment includes: a control portion 10 configured to perform overall control of the image pickup apparatus 1, an image pickup device 3 such as a CCD and CMOS image sensor, an image processing portion 10a configured to perform image processing for image data acquired from the image pickup device 3, an image stabilization portion 5, an image stabilization control portion 11 configured to drive-control the image stabilization portion 5, an attitude detection portion 6, an image display device 7 and an input device 8.

In the present embodiment, the image pickup apparatus 1 has a form of a so-called digital camera which is provided with a body portion 2 accommodating the image pickup device 3, the image stabilization portion 5, the image stabilization control portion 11, the image processing portion 10a and the control portion 10, and a lens barrel 4 fixed to the body portion 2, and which converts an object image formed by an image pickup lens 4a held by the lens barrel 4 to an electrical signal by the image pickup device 3, as an example. Note that the image pickup apparatus 1 may be a so-called lens interchangeable digital camera the lens barrel 4 of which is removable from the body portion 2, or may be a lens-integrated digital camera the lens barrel 4 of which cannot be removed from the body portion 2.

Further, the image pickup apparatus 1 is provided with a power source connection portion 21 connected to a power source 20, such as a commercial power supply, an AC adapter and a battery, and a storage medium connection portion 23 connected to a storage medium 22 such as a flash memory card. In the present embodiment, the power source 20 is a battery as an example and removably accommodated in the body portion 2. The image pickup apparatus 1 operates by power supplied from the power source 20.

Further, in the present embodiment, the storage medium 22 is a nonvolatile memory such as a flash memory card, as an example, and the storage medium 22 is detachably accommodated in the body portion 2 by being connected to the storage medium connection portion 23. Note that the battery to be the power source 20 and the storage medium 22 may be in a form of being fixed in the body portion 2. Further, the storage medium 22 may be in a form of being separated from the body portion 2 and arranged in another electronic apparatus connected to the body portion 2 via wired or wireless communication.

Note that the image pickup apparatus 1 is provided with a lens shutter mechanism or a focal-plane shutter mechanism configured to cause light incident on the image pickup device 3 to be in an incident state or a blocked state, though the mechanism is not shown. Here, a configuration is also possible in which a function of performing exposure control using a so-called electronic shutter system for controlling start and end of exposure for each pixel existing in the image pickup device 3 by an electrical signal from the control portion 10, without using the lens shutter mechanism or the focal plane shutter mechanism. Further, the image pickup apparatus 1 may be provided with a diaphragm mechanism configured to control an amount of incident light onto the image pickup device 3, a mechanism configured to cause a light reduction device such as an ND filter to travel forward and backward on an optical axis, and the like in the lens barrel 4.

Hereinafter, as a definition of an attitude direction of the image pickup apparatus 1, the optical axis direction of the image pickup lens 4a is defined as a Z axis as shown in FIG. 1. Further, a direction which is orthogonal and horizontal to the optical axis and a direction which is orthogonal and vertical to the optical axis when the image pickup apparatus 1 is in an upright state are assumed to be an X axis and a Y axis, respectively. Further, in order to indicate directions of change in an attitude of the image pickup apparatus 1, a rotation direction of the image pickup apparatus 1 around the X axis, a rotation direction around the Y axis, and a rotation direction around the Z axis will be referred to as a pitch direction, a yaw direction and a roll direction, respectively.

Translational movement and rotational movement accompanying the change in the attitude of the image pickup apparatus 1 are detected by the attitude detection portion 6 to be described later. Further, the image stabilization control portion 11 to be described later drive-controls the image stabilization portion 5 in response to change in the attitude of the image pickup apparatus 1 detected by the attitude detection portion 6.

The control portion 10 is configured being provided with a CPU (an operation apparatus), a RAM (a storage device), a flash memory (an auxiliary storage device), an input/output devices, a power control device, a communication portion 10b configured to communicates with the image stabilization control portion 11 to be described later, and the like, and has a configuration of controlling actions of the image pickup apparatus 1 to be described later based on a predetermined program.

The communication portion 10b performs an action of receiving and acquiring an action state of the image stabilization control portion 11 transmitted from the image stabilization control portion 11 and an action of transmitting a control signal to the image stabilization control portion 11 from the control portion 10. The control portion 10 operates according to input and output from the communication portion 10b simultaneously in parallel to a control action performed by the image stabilization control portion 11 to be described later.

Further, the control portion 10 includes the image processing portion 10a configured to combine a plurality of pieces of image data obtained by continuously performing image pickup more than once to generate one piece of image data, which will be described later detailedly.

This embodiment of the present invention shows one example in which, the image processing portion 10a is constituted by hardware circuit. However, the image processing portion 10a may be constituted by software program that is stored in the storage device, and executed using a CPU within the control portion 10.

The image pickup device 3 is arranged so that an image pickup surface (a light receiving surface) is orthogonal to the optical axis of the image pickup lens 4a. The image stabilization portion 5 of the present embodiment holds the image pickup device 3 and has a mechanism configured to cause the image pickup device 3 to move in an X axis direction, a Y axis direction and the roll direction along a plane (an XY plane) orthogonal to the optical axis of the image pickup lens 4a.

Figure 3:
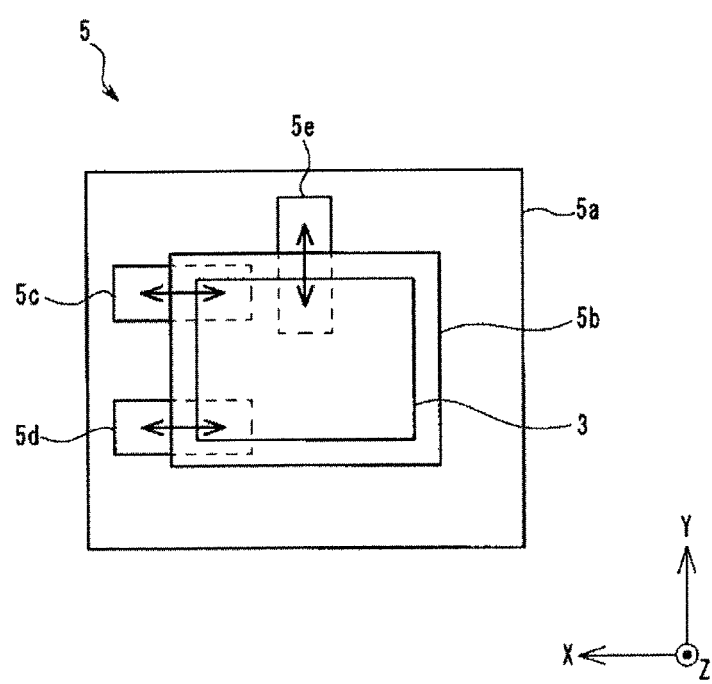
FIG. 3 is a diagram illustrating a configuration of an image stabilization portion of the first embodiment.

For example, as shown in FIG. 3, the image stabilization portion 5 is provided with a base portion 5a, a stage 5b, a first voice coil motor 5c, a second voice coil motor 5d and a third voice coil motor 5e.

The base portion 5a is a part the position of which is fixed to the body portion 2. The stage 5b is a part which holds the image pickup device 3. The stage 5b is arranged so as to be relatively movable in the translation directions (the X axis direction and the Y axis direction) and a rotation direction (a θ direction) to be the roll direction along the XY plane relative to the base portion 5a. Further, the image stabilization portion 5 is provided with a position detection portion configured to detect an amount of displacement in the translation directions of and a rotation angle of the stage 5b relative to the base portion 5a though the position detection portion is not shown.

The first voice coil motor 5c and the second voice coil motor 5d are arranged being separated from each other in the Y axis direction, and each of the voice coil motors generates driving force for causing the stage 5b to move in the X axis direction relative to the base portion 5a and a rotational torque causing the stage 5b to rotationally move in the roll direction relative to the base portion 5a, by supplying a drive current respectively. Further, the third voice coil motor 5e generates driving force for causing the stage 5b to move in the Y axis direction relative to the base portion 5a by supplying a drive current.

By causing both of the first voice coil motor 5c and the second voice coil motor 5d to generate the same driving force in the same direction, the image stabilization portion 5 causes the stage 5b to translationally move in the X axis direction on the XY plane. Further, by causing the third voice coil motor 5e to generate the driving force, the image stabilization portion 5 causes the stage 5b to translationally move in the Y axis direction on the XY plane. Further, by causing magnitudes and/or directions of the driving forces generated by the first voice coil motor 5c and the second voice coil motor 5d to be different, the image stabilization portion 5 can cause the stage 5b to generate a rotational torque in the roll direction relative to the stage 5b and can cause the stage 5b to rotate in the roll direction on the XY plane.

The image stabilization portion 5 is electrically connected to the image stabilization control portion 11. Actions of movement and positioning of the image pickup device 3 by the image stabilization portion 5 are controlled by the image stabilization control portion 11.

Since a configuration of the image stabilization portion 5 for causing the image pickup device 3 to move in the X axis direction, the Y axis direction and the roll direction on the XY plane is well-known, description of the configuration will be omitted. Note that the configuration of the image stabilization portion 5 is not limited to the present embodiment, and, for example, the image stabilization portion 5 may be in a configuration in which a pair of voice coil motors generate driving force for causing the stage 5b to move in the Y axis direction and a rotational torque in the roll direction, and one voice coil motor generates driving force for causing the stage 5b to move in the X axis direction.

The attitude detection portion 6 detects the translational movement and rotational movement of the image pickup apparatus 1. More specifically, the attitude detection portion 6 is provided with a three-axis angular velocity sensor 6a configured to detect an angular velocity accompanying attitude change of the image pickup apparatus 1 in the pitch direction, the yaw direction and the roll direction and a three-axis acceleration sensor 6b configured to detect acceleration accompanying attitude change of the image pickup apparatus 1 in the X axis direction, the Y axis direction and the Z axis direction. Further, the attitude detection portion 6 can detect an attitude of the image pickup apparatus 1 relative to a gravity direction by detecting gravitational acceleration by the three-axis acceleration sensor 6b shown in the description above.

Note that, in the image pickup apparatus 1 according to the present invention, the attitude detection portion 6 is not limited to the configuration in which both of the three-axis angular velocity sensor 6a and the three-axis acceleration sensor 6b are used. For example, in the present first embodiment and a plurality of other embodiments described later, photographing means which detects a relative attitude change of the image pickup apparatus 1 using only the three-axis angular velocity sensor 6a is also shown (the present first embodiment and a third embodiment described later).

The attitude detection portion 6 is electrically connected to the image stabilization control portion 11, and a result of detection of change in the attitude of the image pickup apparatus 1 by the attitude detection portion 6 is inputted to the image stabilization control portion 11.

The lens barrel 4 of the present embodiment is provided with a focal distance detection portion 4b configured to output information about a focal distance and a focus position of the image pickup lens 4a to the control portion 10, and a drive portion 4c configured to cause a position of the image pickup lens 4a to be driven in the optical axis direction. More specifically, the focal distance detection portion 4b has an encoder or the like configured to detect a position of the image pickup lens 4a relative to the optical axis direction. Information about a focal distance detected by the focal distance detection portion 4b is inputted not only inputted to the control portion 10 but also inputted to the image stabilization control portion 11 from the control portion 10 via the communication portion 10b.

Figure 4:
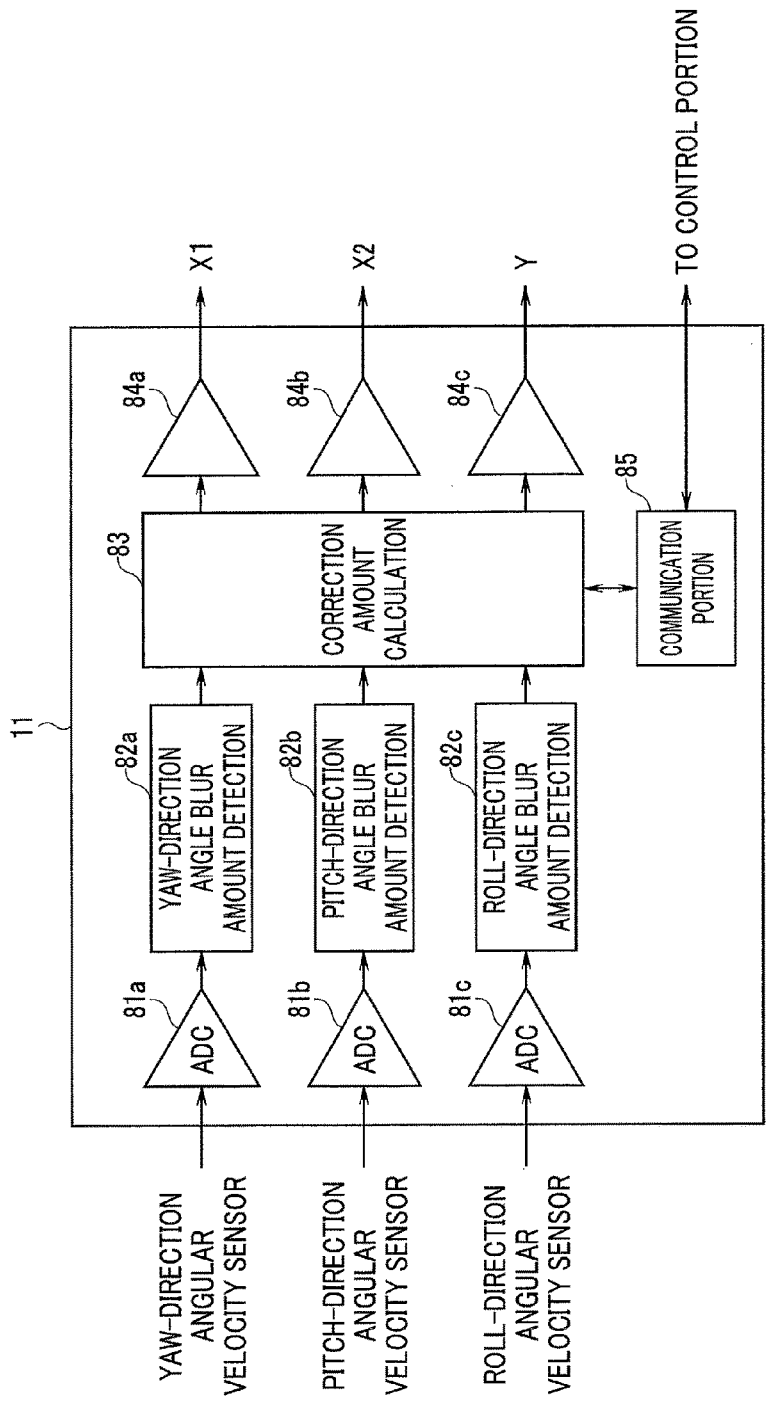
FIG. 4 is a block diagram of an image stabilization control portion of the first embodiment.

FIG. 4 is a block diagram showing an internal configuration of the image stabilization control portion 11. As shown in FIG. 4, the image stabilization control portion 11 is configured with A/D conversion circuits (ADCs) 81a, 81b, 81c and angle blur amount calculation portions 82a, 82b, 82c, a correction amount calculation portion 83, drivers 84a, 84b, 84c and a communication portion 85.

The ADCs 81a, 81b, 81c are circuits configured to sample each of three-axis angular velocity signals in the yaw direction, the pitch direction and the roll direction, which have been outputted from the angular velocity sensor 6a in the attitude detection portion 6 as analog signals, at predetermined time intervals and convert the three-axis angular velocity signal to a digital value.

The angle blur amount calculation portions 82a, 82b, 82c calculate amounts of image movement (Dx, Dy, Dθ) in the X axis direction, the Y axis direction and the roll direction on the image pickup surface of the image pickup device 3 for the digital values of angular velocities outputted from the ADCs 81a, 81b, 81c. In other words, the amount of image movement on the image pickup surface can be referred to as an amount of image blur.

Figure 5:
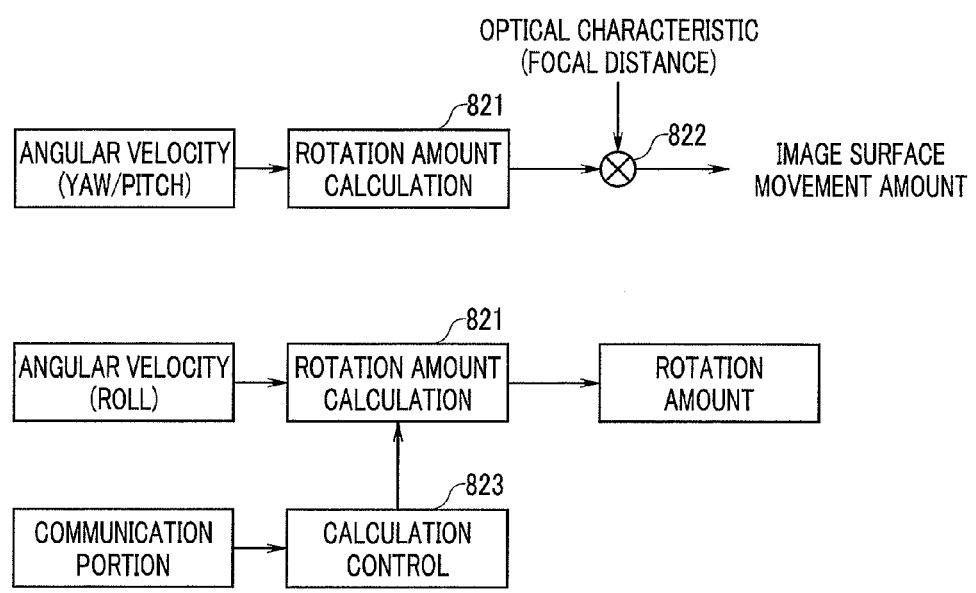
FIG. 5 is a block diagram of an angle blur amount calculation portion of the first embodiment.

A detailed configuration for executing operation processing at the angle blur amount calculation portions 82a, 82b, 82c in the present embodiment will be described with use of a block diagram shown in FIG. 5. A rotation amount calculation block 821 performs integration operation (time integration) for the digital values of angular velocities outputted from the ADCs 81a, 81b, 81c first. Here, the integration operation (time integration) is performed to calculate a relative movement angle relative to each of the three axes in the yaw direction, the pitch direction and the roll direction.

In an integration process 822, the relative movement angle relative to each of the two axes in the yaw direction and the pitch direction is multiplied by a value of an optical characteristic (a focal distance) of the image pickup lens 4a to calculate amounts of image surface movement (Dx, Dy) in horizontal and vertical directions on the image pickup surface. In calculation control 823, a value used for calculation at rotational amount calculation 823 is determined based on an instruction inputted from the control portion 10 via the communication portion 85.

Returning to the description of FIG. 4, remaining components will be described. The correction amount calculation portion 83 calculates an amount of operation for drive-controlling the image stabilization portion 5 from the amounts of image movement (Dx, Dy, Dθ) on the image pickup surface in the X axis direction, the Y axis direction and the roll direction calculated by the angle blur amount calculation portions 82a, 82b, 82c.

The drivers 84a, 84b, 84c output voltage outputs to the first voice coil motor 5c, the second voice coil motor 5d and the third voice coil motor 5e which the image stabilization portion 5 has, according to the amount of operation calculated by the correction amount calculation portion 83.

The communication portion 85 acquires a control instruction from the control portion 10, parameters, such as focal distance information and focus information about the image pickup lens 4a in the lens barrel 4, and the like from the control portion 10.

Next, an action/operation performed by the image stabilization control portion 11 will be described. First, information about the focal distance of the image pickup lens 4a acquired by the control portion 10 and information about rotational movement and translational movement of the image pickup apparatus 1 detected by the attitude detection portion 6 are inputted to the image stabilization control portion 11. In the present embodiment, a detection value by the angular velocity sensor 6a, among detection values by the attitude detection portion 6, is inputted to the image stabilization control portion 11.

Next, the image stabilization control portion 11 performs integration processing of an angular velocity detection output by the attitude detection portion 6, by the angle blur amount calculation portions 82a, 82b, 82c and the correction amount calculation portion 83 to calculate, from the information about the focal distance of the image pickup lens 4a, an amount of image movement relative to the image pickup surface of the image pickup device 3 due to the rotational movement and translational movement of the image pickup apparatus 1 on the image pickup surface of the image pickup device 3.

Then, the image stabilization control portion 11 calculates an amount of drive (an amount of correction) of the image stabilization portion 5 so that image movement relative to the image pickup surface during an exposure period of the image pickup device 3 is offset, by the correction amount calculation portion 83. Based on the calculated amount of drive, the image pickup device 3 is caused to move in the translation direction and the rotation direction by the image stabilization portion 5. Thus, the image pickup apparatus 1 of the present embodiment has a camera stabilization function by an image sensor shift scheme and an image stabilization function called an image stabilizing function or the like. Since details of control and the like for realizing the image stabilization function is well known, detailed description will be omitted. The image stabilization control portion 11 operates concurrently with an action performed by the control portion 10 as described later.

The image display device 7 is configured, for example, with a liquid crystal display device or an organic EL display, and displays an image based on display output control by the control portion 10. The image display device 7 performs display of a graphical user interface (GUI) of the image pickup apparatus 1, display of a live view which functions as a finder during an image pickup action, display of a stored image, and the like.

In the present embodiment, the image display device 7 is arranged in the body portion 2 as an example. Note that the image display device 7 may be separated from the body portion 2 and arranged in another electronic apparatus connected to the body portion 2 via wired or wireless communication. Further, a plurality of image display devices 7 may be arranged in the body portion 2.

The input device 8 is one or more members for a user to input an instruction of an action of the image pickup apparatus 1, such as a lever switch, a dial switch, a button switch and a touch sensor. In the present embodiment, the input device 8 is provided with a power source operation switch 8a and a release switch 8b as an example.

In the shown present embodiment, all the members constituting the input device 8 are provided in the image pickup apparatus 1 as an example. The configuration of the input device 8, however, is not limited to the present embodiment, and, for example, a part or the whole of the input device 8 may be in the form of being separated from the body portion 2 and arranged in another electronic apparatus connected to the body portion 2 via wired or wireless communication.

In the image pickup apparatus 1 of the present embodiment, the image pickup action is executed by the release switch 8b being pushed down by the user. In the image pickup action, an object image formed by the image pickup lens 4a is converted to an electrical signal by the image pickup device 3 and then stored into the RAM of the control portion 10 as image data. The control portion 10 stores the image data stored in the RAM into the storage medium 22 as an electronic file in a predetermined format.

Next, the actions of the image pickup apparatus 1 of the present embodiment will be described. The control portion 10 includes the image processing portion 10a configured to combine a plurality of pieces of image data obtained by continuously performing image pickup more than once to generate one piece of image data.

Further, the image stabilization control portion 11 operates in parallel to a processing action performed by the control portion 10. More specifically, the image stabilization control portion 11 calculates an amount of image movement relative to the image pickup surface of the image pickup device 3 caused by rotational movement of the image pickup apparatus 1, based on information about the rotational movement of the image pickup apparatus 1 detected by the attitude detection portion 6. Then, the image stabilization control portion 11 causes an amount of drive for the image stabilization portion 5 to be calculated so that image movement relative to the image pickup surface during an exposure period of the image pickup device 3 is offset. Based on the calculated amount of drive, an action of causing the image pickup device 3 to move in the translation direction and the rotation direction is caused to be performed by the image stabilization portion 5.

Hereinafter, the one piece of image data generated by the image processing portion 10a combining a plurality of pieces of image data will be referred to as composite image data. Further, a set of the plurality of pieces of image data the image processing portion 10a uses to generate the composite image data will be referred to as a group of continuously picked-up images. At the time of the image processing portion 10a generating the composite image data, the group of continuously picked-up images may be in a state of being stored in the storage medium 22 or may be in a state of only being temporarily stored in the RAM without being stored in the storage medium 22.

In the present embodiment, it is assumed that the plurality of pieces of image data included in the group of continuously picked-up images are obtained by the image pickup apparatus 1 automatically repeating the image pickup action a predetermined number of times after the release switch 8b being pushed down once by the user, as an example.

Note that the group of continuously picked-up images may be obtained, for example, by the image pickup action being repeated at predetermined time intervals during a period during which the release switch 8b is being pushed down by the user or may be obtained, for example, by the image pickup action being executed each time the release switch 8b is repeatedly pushed down by the user.

The image pickup apparatus 1 of the present embodiment obtains the composite image data by overlapping the images of the group of continuously picked-up images obtained in a state that the image pickup apparatus 1 is held so as to move as less as possible, by the image processing portion 10a.

Such an action of obtaining the composite image data by overlapping the images of the group of continuously picked-up images obtained in a state that the image pickup apparatus 1 is held at a predetermined position is executed, for example, by camera shake reduction photographing, HDR (high-dynamic-range) photographing, or depth synthesis photographing (super-resolution photographing).

The camera shake reduction photographing is such that, by acquiring a group of continuously picked-up images by performing continuous photographing with a relatively short exposure time period, with which an image blur does not easily occur, and positioning of and making an additive synthesis of the group of continuously picked-up images, composite image data without an image blur and with appropriate exposure is obtained. Such a photographing method is also referred to as, for example, handheld night photographing.

Further, the HDR photographing is such that, by acquiring a group of continuously picked-up images by performing photographing of an object with different exposure values a plurality number of times, extracting image areas without high-luminance-side luminance saturation (blown out highlights) and image areas without low-luminance-side luminance saturation (blocked up shadows) from the group of continuously picked-up images, and performing positioning and combination of the image areas, composite image data in which gradation is secured for both of bright parts and dark parts is obtained.

Further, the depth synthesis photographing is such that, by acquiring a group of continuously picked-up images by performing photographing of an object with different focal distances a plurality of number of times, and extracting and combining only parts in which the object is focused in individual pieces of image data, composite image data with a deep depth of field is obtained.

Figure 6:
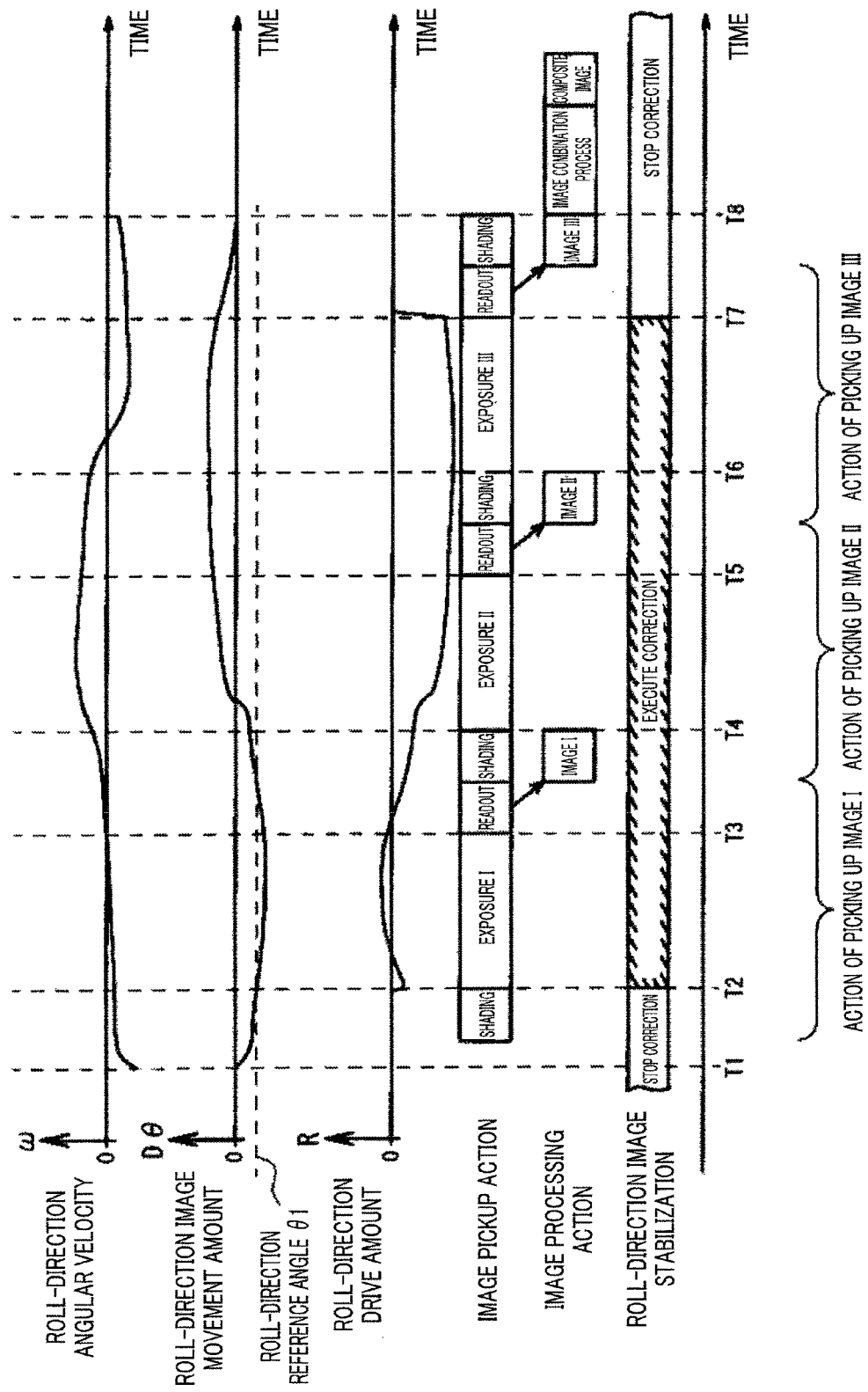
FIG. 6 is a diagram illustrating an action/operation of the image pickup apparatus of the first embodiment acquiring composite image data.

FIG. 6 schematically shows an action/operation of the image pickup apparatus 1 of the present embodiment acquiring composite image data. FIG. 6 shows an action of the image pickup apparatus 1 acquiring a group of continuously picked-up images constituted by an image I, an image II and an image III obtained by performing continuous image pickup three times and acquiring one piece of composite image data from the group of continuously picked-up images by performing a combination process, as an example.

FIG. 6 shows an example of a timing chart of an action of the image pickup apparatus 1 at the time of acquiring the group of continuously picked-up images to acquire the composite image data, a rotational angular velocity ω in the roll direction of the image pickup apparatus 1 detected by the attitude detection portion 6, an amount of image movement Dθ in the roll direction calculated by the correction amount calculation portion 83, and an amount of drive (an amount of correction) R in the roll direction which the image stabilization control portion 11 outputs to the image stabilization portion 5, with time indicated by a horizontal axis.

Here, the amount of image movement Dθ in the roll direction assumes that an origin position of the image pickup device 3 movably held by the image stabilization portion 5 is 0. The origin position of the image pickup device 3 is such a position that a center of a light receiving surface of the image pickup device 3 corresponds to the optical axis of the image pickup lens 4a, and long sides of an external shape of the light receiving surface are parallel to a bottom surface of the body portion 2.

Figure 7:
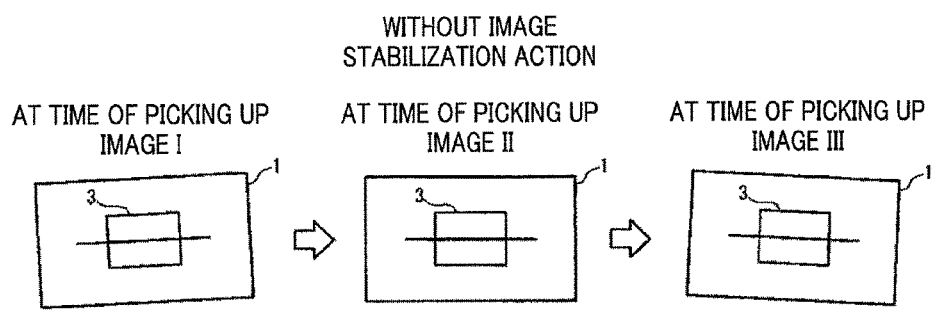
FIG. 7 is a diagram showing a case of performing continuous image pickup without performing an image stabilization action.
Figure 8:
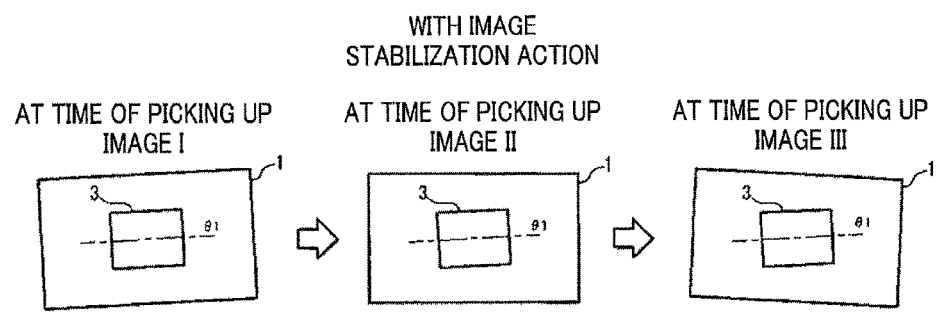
FIG. 8 is a diagram showing a case of performing continuous image pickup while performing the image stabilization action, by the image pickup apparatus of the first embodiment.

Further, FIG. 7 is a schematic diagram of a position of the image pickup device 3 relative to the image pickup apparatus 1 when an image stabilization action by the image stabilization control portion 11 and the image stabilization portion 5 is not executed in a case where the image pickup apparatus 1 rotationally moves in the roll direction as shown in FIG. 6. Further, FIG. 8 is a schematic diagram of a position of the image pickup device 3 relative to the image pickup apparatus 1 when the image stabilization action by the image stabilization control portion 11 and the image stabilization portion 5 is executed in the case where the image pickup apparatus 1 rotationally moves in the roll direction as shown in FIG. 6. FIGS. 7 and 8 show a state when the image pickup apparatus 1 is seen from a direction parallel to the Z axis.

Figure 9:
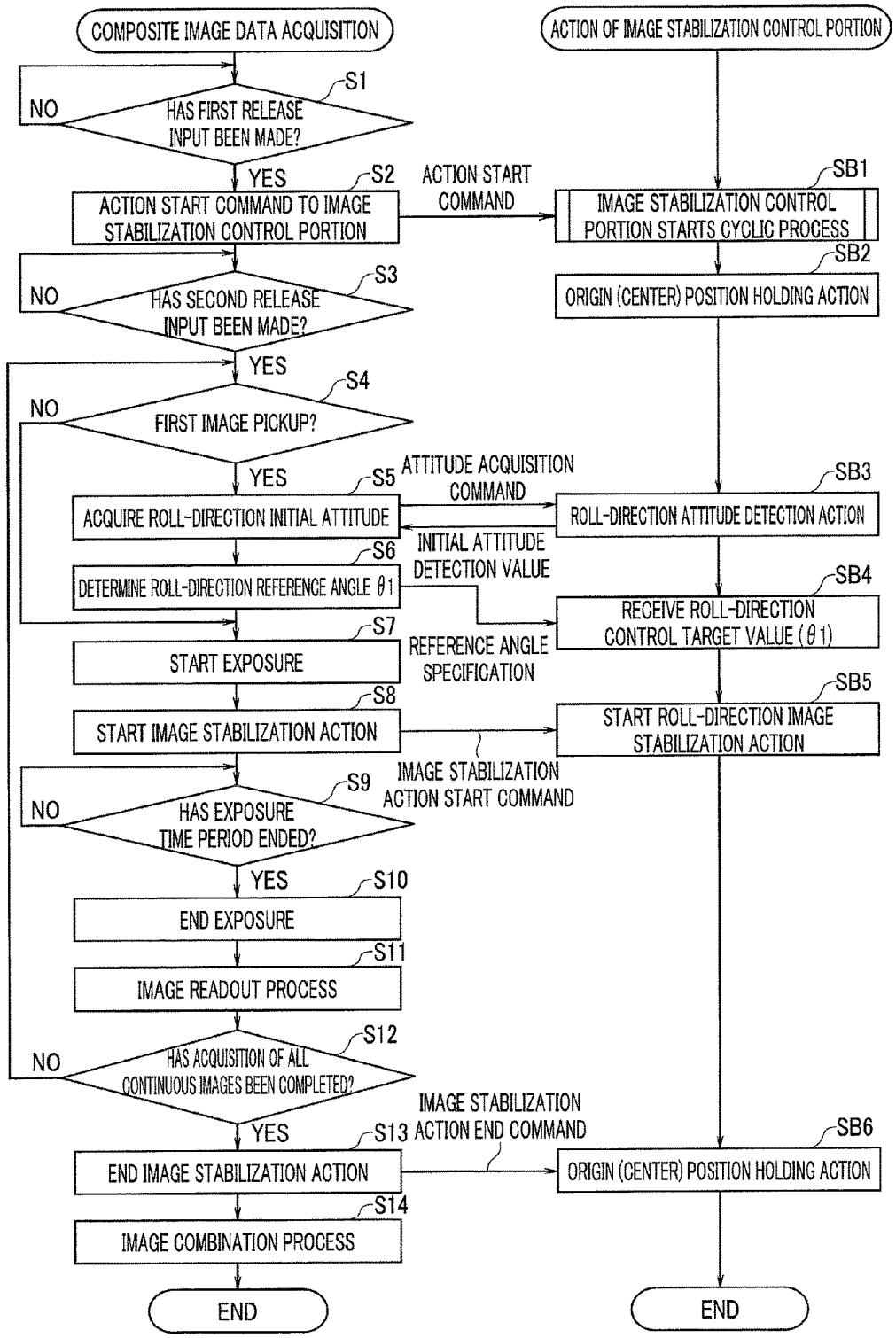
FIG. 9 is a flowchart of an action of the image pickup apparatus of the first embodiment acquiring a group of continuously picked-up images to acquire composite image data.
Figure 10:
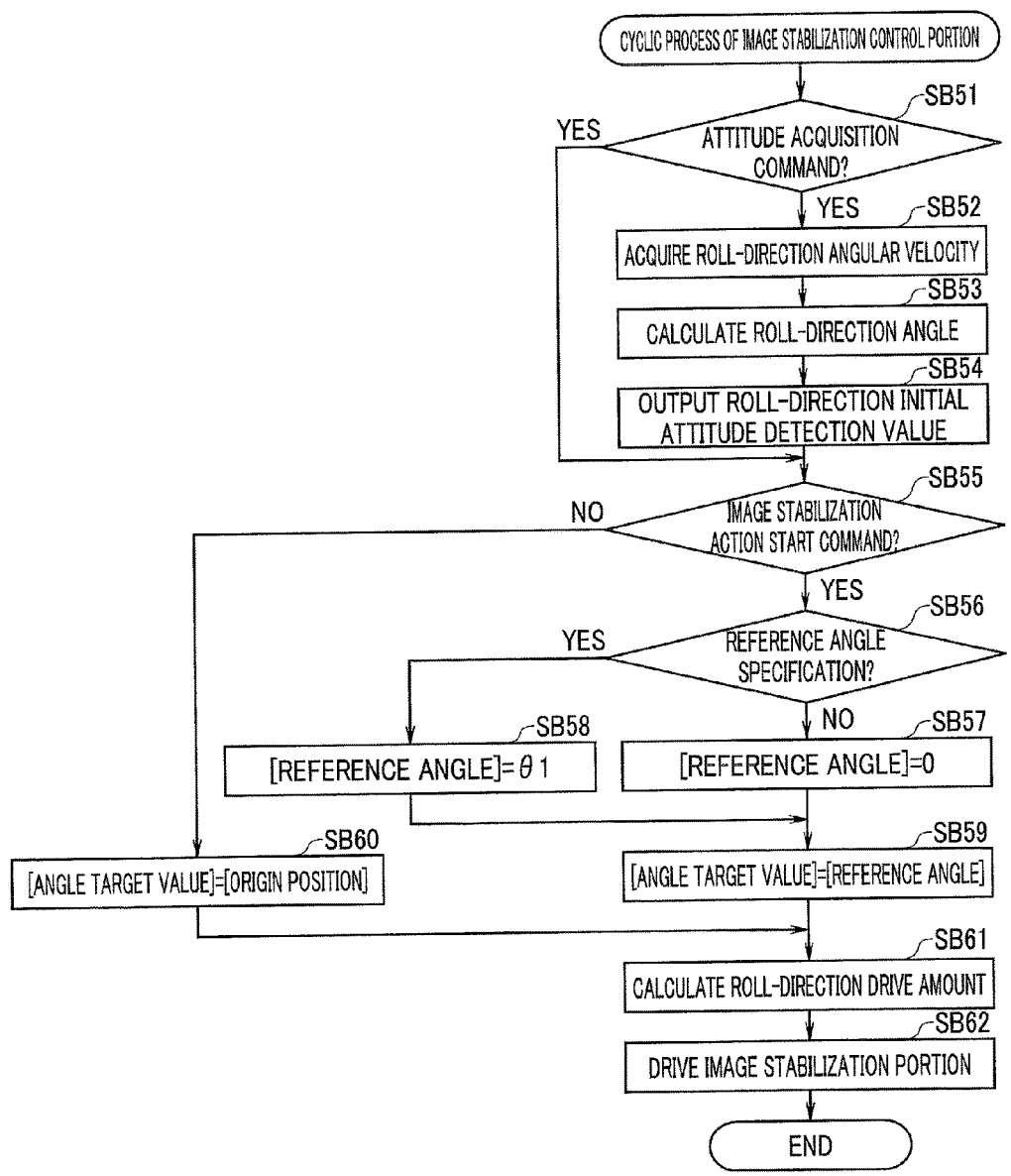
FIG. 10 is a flowchart of a periodic action of the image stabilization control portion of the first embodiment.

FIGS. 9 and 10 are flowcharts of the action of the image pickup apparatus 1 of the present embodiment acquiring a group of continuously picked-up images to acquire composite image data. In the present embodiment, both of the control portion 10 and the image stabilization control portion 11 perform actions in parallel. Therefore, the flowchart of FIG. 9 simultaneously shows processes performed by both of the control portion 10 and the image stabilization control portion 11. Further, in order to distinguish between process steps of both of the control portion 10 and the image stabilization control portion 11, S is attached to reference numerals of action process steps of the control portion 10, and SB is attached to reference numerals of action process steps of the image stabilization control portion 11. Further, the flowchart of FIG. 10 shows a flow of a cyclic process which the image stabilization control portion 11 performs in each control cycle, which is a constant cycle.

In the present embodiment, the release switch 8b is a so-called two-stage push button switch provided with two switches which operate by different amounts of push-in or different push-in forces, as an example. The image pickup apparatus 1 executes an image pickup preparation action such as focus control and exposure control if the release switch 8b is pushed down with a small amount of force (a half-push operation input: hereinafter referred to as a first release input), and executes a composite image data acquisition action if the release switch 8b is pushed down with a larger amount of force (an all-push operation: hereinafter referred to as a second release input). In the timing chart of FIG. 6, the time T1 is time of the first release input, and time T2 is time of the second release input.

As shown in FIG. 9, the control portion 10 waits until the release switch 8b is operated by the user to make the first release input. When the first release input is made, the control portion 10 proceeds to step S2.

At step S2, the control portion 10 outputs an action start command to the image stabilization control portion 11. By executing step S2, the image stabilization control portion 11 starts the cyclic process at step SB1. The cyclic process of the image stabilization control portion 11 will be described later.

After starting the cyclic process of step SB1, the image stabilization control portion 11 drives the image stabilization portion 5 to execute an origin position holding action for holding the image pickup device 3 at the origin position at step SB2. That is, at the time of the first release input, the image pickup device 3 is held at the origin position.

Next, at step S3, the control portion 10 waits until the second release input is made. When the second release input is made, the control portion 10 proceeds to step S4. Note that, for example, if the user causes force to be given to the release switch 8b to disappear, and the first release input disappears without the second release input being made, then the control portion 10 returns to step S1.

At step S4, it is judged whether or not an image pickup action is a first image pickup action among continuous image pickup actions for acquiring a group of continuously picked-up images. In other words, it is judged at step S4 whether the image I in the group of continuously picked-up images has been picked up or not.

If it is judged at step S4 that the image pickup action is the first image pickup action among the continuous image pickup actions, the control portion 10 proceeds to step S5. If it is judged at step S4 that the image pickup action is not the first image pickup action among the continuous image pickup actions, the control portion 10 skips steps S5 and S6 and proceeds to step S7.

At step S5, the control portion 10 acquires information about a roll-direction initial attitude from the image stabilization control portion 11. More specifically, at step S5, the control portion 10 outputs an attitude acquisition command to the image stabilization control portion 11. Receiving the attitude acquisition command, the image stabilization control portion 11 returns a roll-direction initial attitude detection value, which is information about a roll-direction attitude of the image pickup apparatus 1 calculated based on a detection result of the attitude detection portion 6, to the control portion 10 (step SB3). The roll-direction initial attitude detection value is a detection value of an attitude of the image pickup apparatus 1 detected by the attitude detection portion 6 at the time of the second release input (the time T2).

Next, at step S6, the control portion 10 sets the roll-direction initial attitude detection value inputted from the image stabilization control portion 11 at step S5 as a roll-direction reference angle θ1 and specifies the value of the roll-direction reference angle θ1 to the image stabilization control portion 11. The image stabilization control portion 11 sets the roll-direction reference angle θ1 as a target value for maintaining a roll-direction attitude of the image pickup device 3 in an image stabilization action (step SB4).

At step S7, the control portion 10 starts exposure by the image pickup device 3. Further, at step S8, the control portion 10 outputs a command to start a roll-direction image stabilization action to the image stabilization control portion 11. The image stabilization control portion 11 which has received the command to start the image stabilization action starts the roll-direction image stabilization action for driving the image stabilization portion 5 in the roll direction, according to the detection result by the attitude detection portion 6 (step SB5).

Then, the control portion 10 waits until the exposure time period ends at step S9 and, after that, ends exposure by the image pickup device 3 at step S10. Then, at step S11, the control portion 10 executes an image readout process for generating an image from an output signal of the image pickup device 3. By executing the actions of steps S7 to S11, one piece of image data is acquired.

Next, at step S12, the control portion 10 judges whether acquisition of all pieces of image data constituting the group of continuously picked-up images has been completed or not. In the case of the present embodiment, the control portion 10 judges whether acquisition of the image III has been completed or not.

If judging at step S12 that acquisition of all the pieces of image data constituting the group of continuously picked-up images has not been completed, the control portion 10 returns to step S4 and repeats the action described above.

On the other hand, if judging at step S12 that acquisition of all the pieces of image data constituting the group of continuously picked-up images has been completed, the control portion 10 proceeds to step S13. At step S13, the control portion 10 outputs a command to end the roll-direction image stabilization action to the image stabilization control portion 11. The image stabilization control portion 11 which has received the command to end the image stabilization action ends the roll-direction image stabilization action, and drives the image stabilization portion 5 to start the origin position holding action for holding the image pickup device 3 at the origin position (step SB6).

Then, at step S14, the control portion 10 combines the images of the group of continuously picked-up images by the image processing portion 10a to generate composite image data, and stores the composite image data into the storage medium 22.

The cyclic process of the image stabilization control portion 11 shown in FIG. 10 will be described below.

In the cyclic process, first at step SB51, the image stabilization control portion 11 judges whether an attitude acquisition command from the control portion 10 has been inputted or not. The attitude acquisition command is outputted from the control portion 10 at step S5 as described above.

If judging at step SB51 that the attitude acquisition command has been inputted, the image stabilization control portion 11 executes steps SB52 to SB54 and, after that, executes step SB55. If judging at step SB51 that the attitude acquisition command has not been inputted, the image stabilization control portion 11 skips steps SB52 to SB54 and executes step SB55.

At steps SB52 to SB54, the image stabilization control portion 11 acquires a detection value of a roll-direction angular velocity by the attitude detection portion 6 (step SB52), calculates the roll-direction attitude of the image pickup apparatus 1 based on the detection value (step SB53), and outputs the value to the control portion 10 as the roll-direction initial attitude detection value (step SB54).

At step SB55, the image stabilization control portion 11 judges whether an image stabilization action start command from the control portion 10 has been inputted or not. The image stabilization action start command is outputted from the control portion 10 at step S8 as described above.

If judging at step SB55 that the image stabilization action start command has not been inputted, the image stabilization control portion 11 proceeds to step S60 and sets an angle target value, which is a roll-direction target value for holding the attitude of the image pickup device 3, as the origin position. Then, proceeding to step SB61, the image stabilization control portion 11 calculates the amount of drive (the amount of correction) R in the roll direction required to cause the attitude of the image pickup device 3 to move to the origin position. Then, the image stabilization control portion 11 proceeds to step SB62 and drives the image stabilization portion 5 with the amount of drive calculated at step SB61 to cause the image pickup device 3 to move to the origin position.

On the other hand, judging at step SB55 that the image stabilization action start command has been inputted, the image stabilization control portion 11 proceeds to step SB56. At step SB56, the image stabilization control portion 11 judges whether or not specification of the value of the roll-direction reference angle θ1 has been inputted by the control portion 10. The specification of the value of the roll-direction reference angle θ1 is outputted from the control portion 10 at step S6 as described above.

If judging at step SB56 that the specification of the value of the roll-direction reference angle θ1 has not been inputted, the image stabilization control portion 11 proceeds to step SB57 and sets the value of the reference angle to 0. On the other hand, if judging at step SB56 that the specification of the value of the roll-direction reference angle θ1 has been inputted, the image stabilization control portion 11 proceeds to step SB57 and sets the value of the reference angle to θ1.

Then, at step SB59, the image stabilization control portion 11 sets the angle target value, which is the roll-direction target value for holding the attitude of the image pickup device 3, as the reference angle. Then, proceeding to step SB61, the image stabilization control portion 11 calculates the amount of drive (the amount of correction) R in the roll direction required to cause the attitude of the image pickup device 3 to move to the reference angle. Then, proceeding to step SB62, the image stabilization control portion 11 drives the image stabilization portion 5 with the amount of drive calculated at step SB61 to cause the image pickup device 3 to move to the reference angle.

As described above, the image pickup apparatus 1 of the present embodiment continues to execute the roll-direction image stabilization action during a period from the time (the time T2) of starting exposure of an image picked up for the first time (the image I) in the group of continuously picked-up images until the time (the time T7) of ending exposure of a last image (the image III) in the group of continuously picked-up images. Here, the roll-direction image stabilization action from the time T2 until the time T7 maintains the roll-direction attitude of the image pickup device 3 at a roll-direction attitude at the time T2 (the roll-direction reference angle θ1 ).

For example, in a case of performing continuous image pickup of three images in a state that the image pickup apparatus 1 is held by user's hands as shown in FIG. 7, there may be a case where the image pickup apparatus 1 rotates in the roll direction during a period of the continuous photographing. Even in the case where the image pickup apparatus 1 rotates in the roll direction during the period of the continuous photographing as described above, the image pickup apparatus 1 of the present embodiment keeps the attitude of the image pickup device 3 at an attitude at a time of first image pickup as shown in FIG. 8.

Therefore, in a group of continuously picked-up images acquired by the image pickup apparatus 1 of the present embodiment, an angle of an object is constant in all images. Therefore, at the time of generating composite image data from a group of continuously picked-up images by the image processing portion 10a, a positioning process for rotating images is not required, and it is possible to execute combination of a plurality of images only by a positioning process for causing images to translationally move along the horizontal and vertical axes.

That is, in the present embodiment, for example, in the camera shake reduction photographing, the HDR (high-dynamic-range) photographing, or the depth synthesis photographing (super-resolution photographing) for obtaining composite image data by overlapping the images of the group of continuously picked-up images obtained in the state that the image pickup apparatus 1 is held at a predetermined position, it is possible to reduce an operation load related to the combination process for generating the composite image data. By reducing the operation load related to the combination process, it is possible to realize, for example, improvement of responsiveness of actions of the image pickup apparatus and reduction of power consumption.

(Second Embodiment)

Next, a second embodiment of the present invention will be described. Only points of difference from the first embodiment will be described below. Same reference numerals are given to components similar to those of the first embodiment, and description of the components will be appropriately omitted.

The image pickup apparatus 1 of the present embodiment is different from that of the first embodiment in how to determine the value of the roll-direction reference angle θ1 to be a target value for maintaining the attitude of the image pickup device 3 by the roll-direction image stabilization action at a time of obtaining the group of continuously picked-up images.

Figure 11:
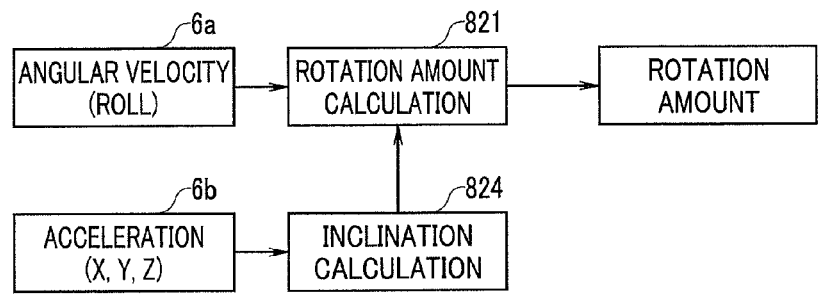
FIG. 11 is a diagram illustrating a configuration of an image stabilization portion of a second embodiment.

As shown in FIG. 11, the image stabilization control portion 11 of the present embodiment executes inclination calculation 824 for calculating inclination of the image pickup device 3 relative to the gravity direction, based on an output from the three-axis acceleration sensor 6b of the attitude detection portion 6 in an operation process of angle blur amount calculation portions.

Figure 12:
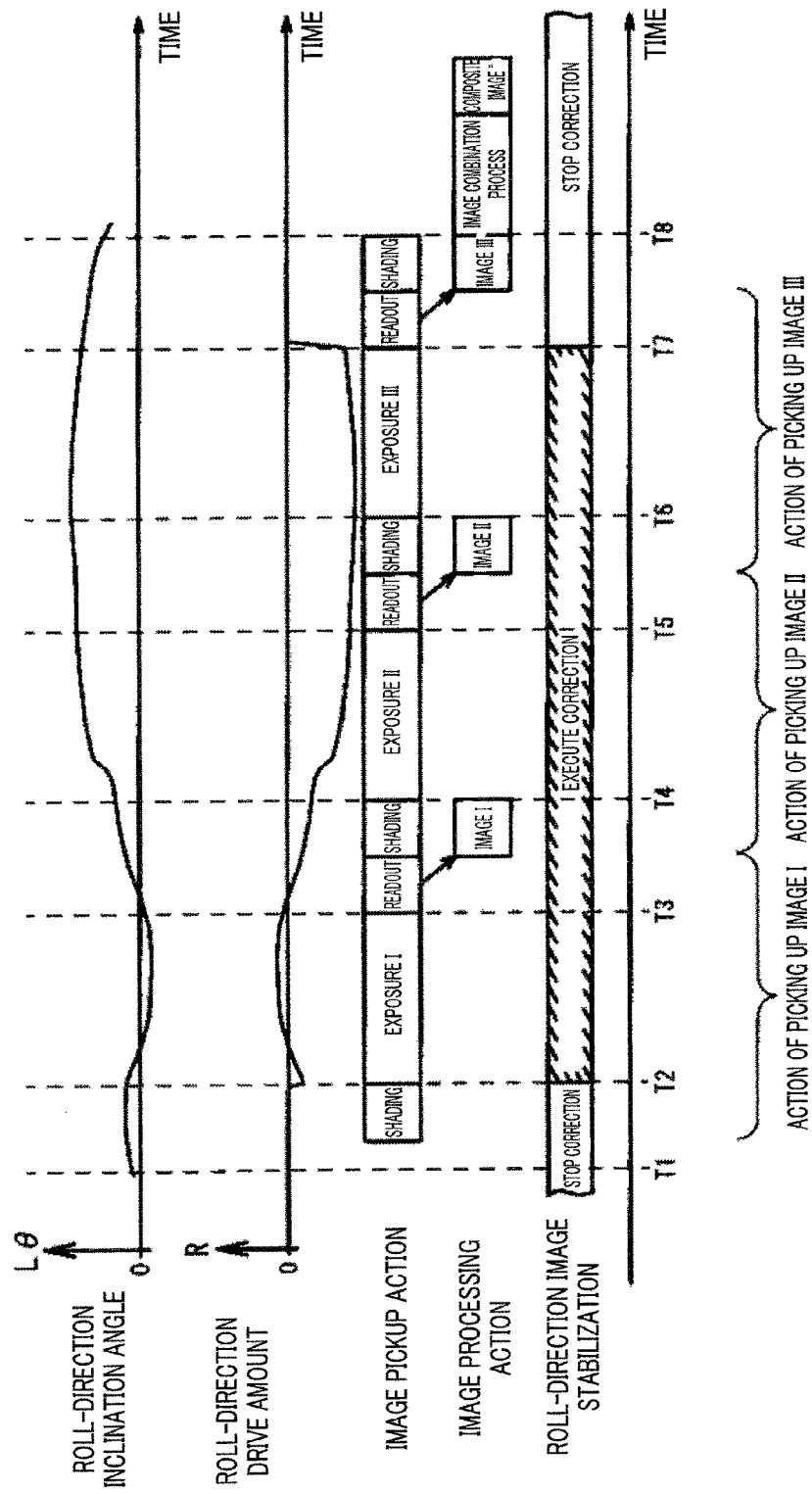
FIG. 12 is a diagram illustrating an action/operation of the image pickup apparatus of the second embodiment acquiring composite image data.

FIG. 12 schematically shows an action/operation of the image pickup apparatus 1 of the present embodiment acquiring composite image data. FIG. 12 shows an action of the image pickup apparatus 1 acquiring a group of continuously picked-up images constituted by an image I, an image II and an image III obtained by performing continuous image pickup three times and acquiring one piece of composite image data from the group of continuously picked-up images by performing the combination process, as an example.

FIG. 12 shows an example of a timing chart of an action of the image pickup apparatus 1 at the time of acquiring the group of continuously picked-up images to acquire the composite image data, a roll-direction inclination angle Lθ of the image pickup device 3 relative to the gravity direction detected by the attitude detection portion 6, and the amount of drive (the amount of correction) R in the roll direction which the image stabilization control portion 11 outputs to the image stabilization portion 5, with time indicated by a horizontal axis.

Here, it is assumed that the inclination angle Lθ of the image pickup device 3 relative to the gravity direction is a roll-direction inclination angle of the long sides of the external shape of the light receiving surface of the image pickup device 3 relative to horizontality. That is, when the value of Lθ is 0, the long sides of the external shape of the light receiving surface of the image pickup device 3 are horizontal.

Figure 13:
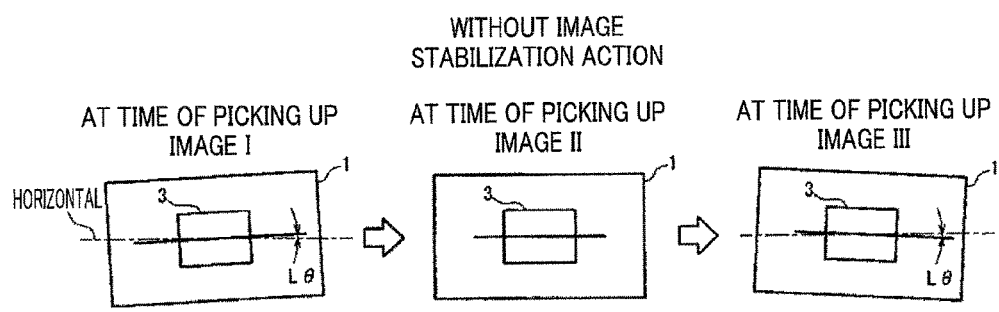
FIG. 13 is a diagram showing a case of performing continuous image pickup without performing an image stabilization action.
Figure 14:
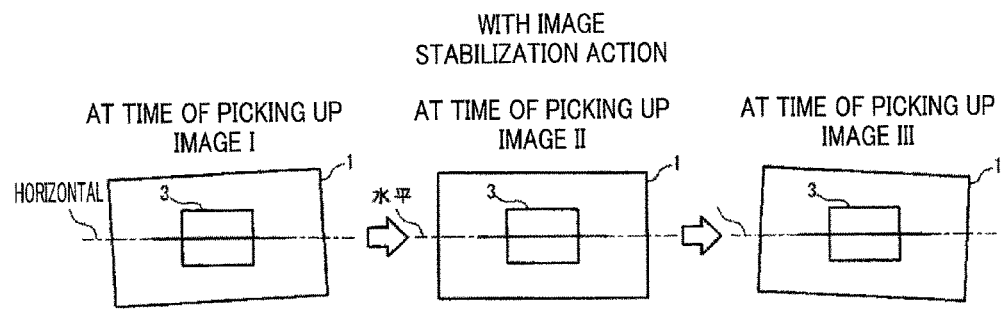
FIG. 14 is a diagram showing a case of performing continuous image pickup while performing the image stabilization action, by the image pickup apparatus of the second embodiment.

Further, FIG. 13 is a schematic diagram of a position of the image pickup device 3 relative to the image pickup apparatus 1 when the image stabilization action by the image stabilization control portion 11 and the image stabilization portion 5 is not executed in a case where the image pickup apparatus 1 rotationally moves in the roll direction as shown in FIG. 12. Further, FIG. 14 is a schematic diagram of a position of the image pickup device 3 relative to the image pickup apparatus 1 when the image stabilization action by the image stabilization control portion 11 and the image stabilization portion 5 is executed in the case where the image pickup apparatus 1 rotationally moves in the roll direction as shown in FIG. 12. FIGS. 13 and 14 show a state when the image pickup apparatus 1 is seen from a direction parallel to the Z axis.

Figure 15:
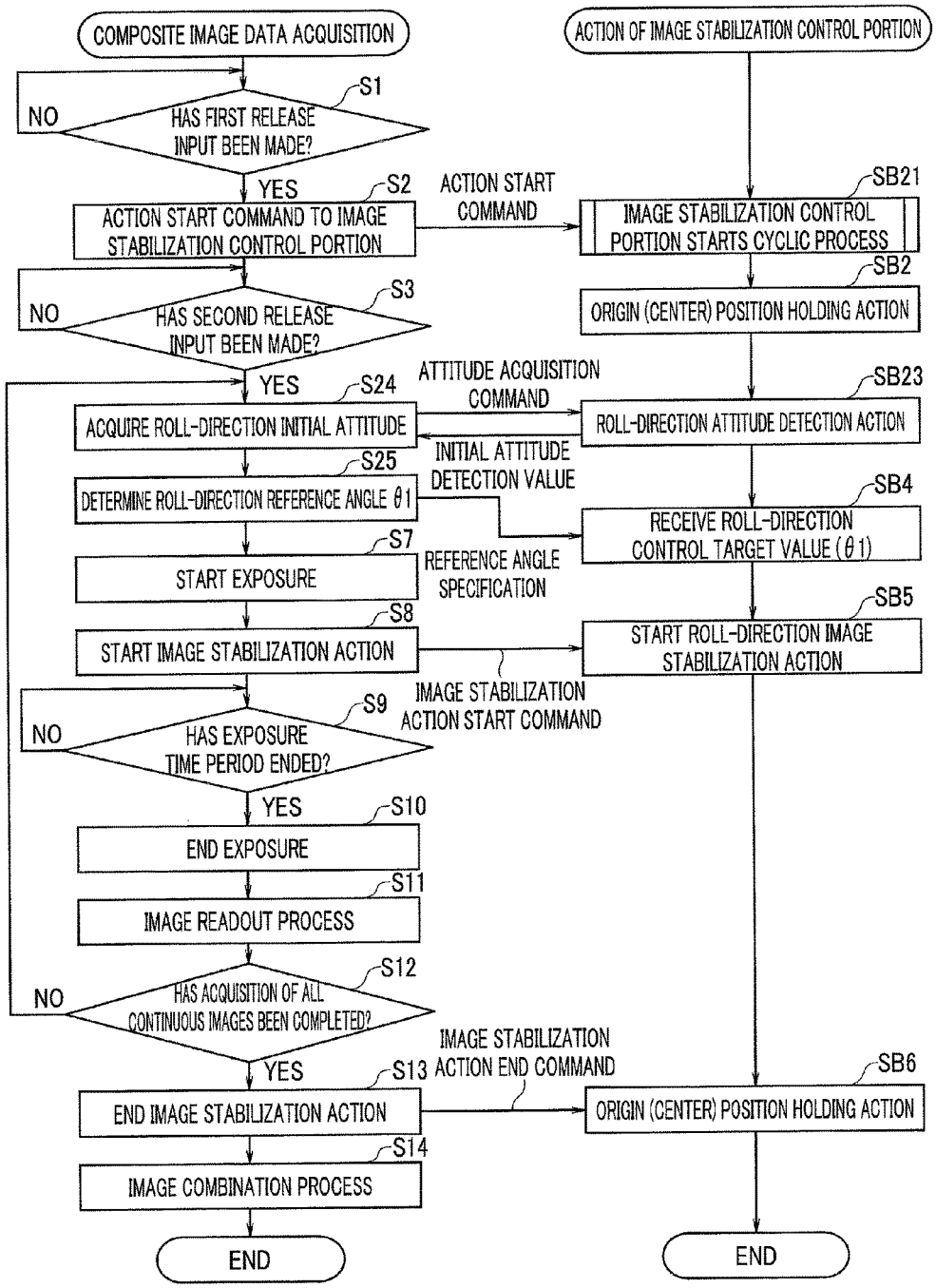
FIG. 15 is a flowchart of an action of the image pickup apparatus of the second embodiment acquiring a group of continuously picked-up images to acquire composite image data.
Figure 16:
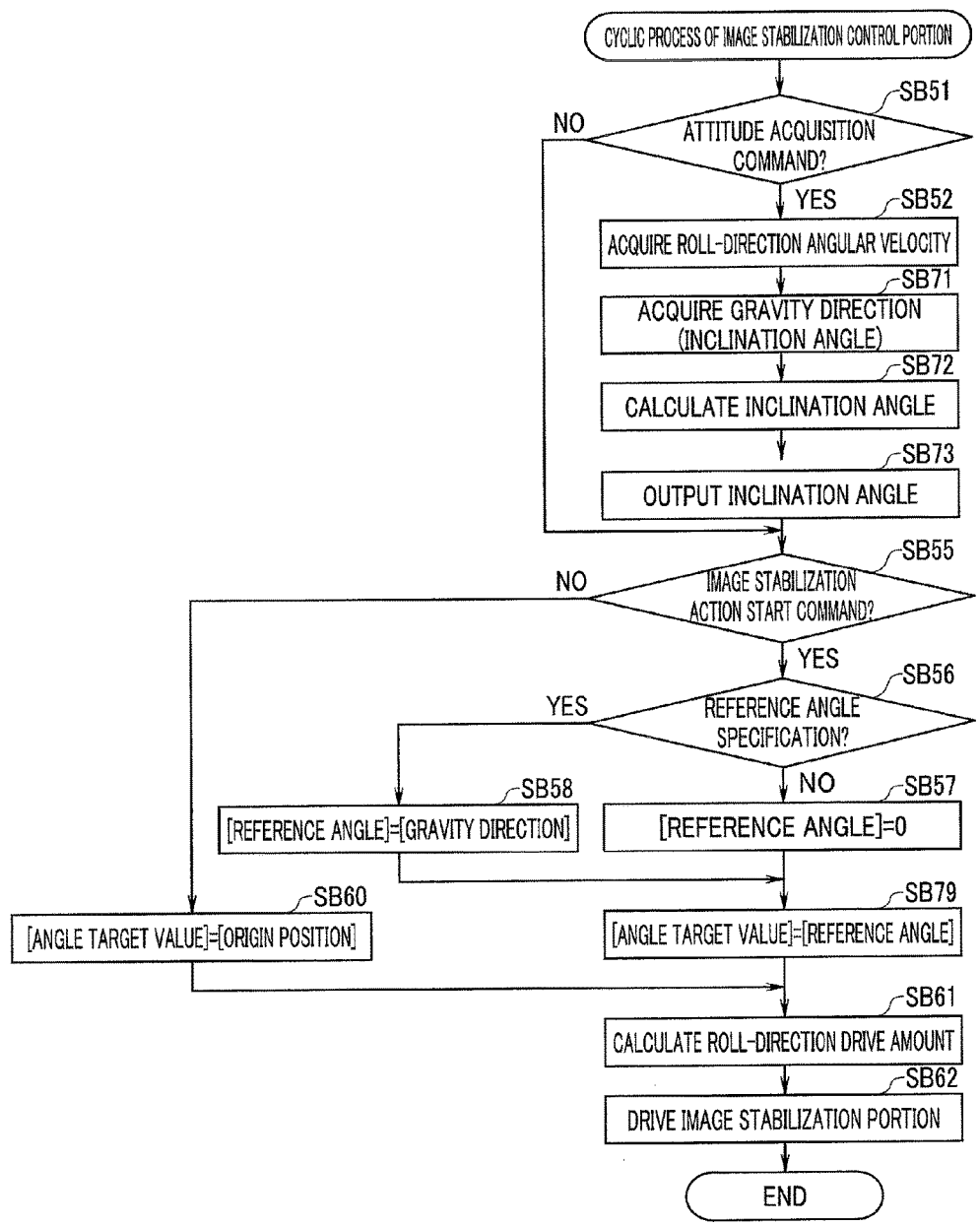
FIG. 16 is a flowchart of a periodic action of the image stabilization control portion of the second embodiment.

FIGS. 15 and 16 are flowcharts of the action of the image pickup apparatus 1 of the present embodiment acquiring a group of continuously picked-up images to acquire composite image data.

As shown in FIG. 15, the control portion 10 waits until the release switch 8b is operated by the user to make a first release input. When the first release input is made, the control portion 10 proceeds to step S2.

At step S2, the control portion 10 outputs an action start command to the image stabilization control portion 11. By executing step S2, the image stabilization control portion 11 starts a cyclic process at step SB21. The cyclic process of the image stabilization control portion 11 will be described later.

After starting the cyclic process of step SB21, the image stabilization control portion 11 drives the image stabilization portion 5 to execute an origin position holding action for holding the image pickup device 3 at the origin position at step SB2. That is, at the time of the first release input, the image pickup device 3 is held at the origin position.

Next, at step S3, the control portion 10 waits until a second release input is made. When the second release input is made, the control portion 10 proceeds to step S24. Note that, for example, if the user causes force to be given to the release switch 8b to disappear, and the first release input disappears without the second release input being made, then the control portion 10 returns to step S1.

At step S24, the control portion 10 acquires information about a roll-direction initial attitude from the image stabilization control portion 11. More specifically, at step S24, the control portion 10 outputs an attitude acquisition command to the image stabilization control portion 11. Receiving the attitude acquisition command, the image stabilization control portion 11 returns the value of the inclination angle Lθ of the image pickup device 3 relative to the gravity direction, which has been calculated based on a detection result of the attitude detection portion 6, to the control portion 10 as a roll-direction initial attitude detection value (step SB23). That is, the roll-direction initial attitude detection value of the present embodiment is the inclination angle Lθ of the image pickup device 3 relative to the gravity direction detected by the attitude detection portion 6 at the time of the second release input (the time T2).

Next, at step S25, the control portion 10 sets the roll-direction initial attitude detection value inputted from the image stabilization control portion 11 at step S24 as a roll-direction reference angle θ1 and specifies the value of the roll-direction reference angle θ1 to the image stabilization control portion 11. The image stabilization control portion 11 sets the roll-direction reference angle θ1 as a target value for maintaining the roll-direction attitude of the image pickup device 3 in an image stabilization action (step SB4).

Since the actions of the control portion 10 at and after step S7 and the actions of the image stabilization control portion 11 at and after step SB5 are similar to those of the first embodiment, description of the actions will be omitted.

The cyclic process of the image stabilization control portion 11 shown in FIG. 16 will be described below.

In the cyclic process, first at step SB51, the image stabilization control portion 11 judges whether an attitude acquisition command from the control portion 10 has been inputted or not. The attitude acquisition command is outputted from the control portion 10 at step S24 as described above.

If judging at step SB51 that the attitude acquisition command has been inputted, the image stabilization control portion 11 executes steps SB52 to SB73 and, after that, executes step SB55. If judging at step SB51 that the attitude acquisition command has not been inputted, the image stabilization control portion 11 skips steps SB52 to SB73 and executes step SB55.

At steps SB52 to SB73, the image stabilization control portion 11 acquires a detection value of a roll-direction angular velocity by the attitude detection portion 6 (step SB52), and acquires a value of acceleration by the three-axis acceleration sensor 6b of the attitude detection portion 6 (step SB71). Then, the image stabilization control portion 11 calculates the inclination angle Lθ of the image pickup device 3 relative to the gravity direction based on the value of the acceleration by the three-axis acceleration sensor 6b (step SB72) and outputs the value to the control portion 10 as the roll-direction initial attitude detection value (step SB73).

At step SB55, the image stabilization control portion 11 judges whether an image stabilization action start command from the control portion 10 has been inputted or not. The image stabilization action start command is outputted from the control portion 10 at step S8 as described above.

If judging at step SB55 that the image stabilization action start command has not been inputted, the image stabilization control portion 11 proceeds to step S60, and sets an angle target value, which is a roll-direction target value for holding the attitude of the image pickup device 3, as the origin position. Then, proceeding to step SB61, the image stabilization control portion 11 calculates the amount of drive (the amount of correction) R in the roll direction required to cause the attitude of the image pickup device 3 to move to the origin position. Then, the image stabilization control portion 11 proceeds to step SB62 and drives the image stabilization portion 5 with the amount of drive calculated at step SB61 to cause the image pickup device 3 to move to the origin position.

On the other hand, judging at step SB55 that the image stabilization action start command has been inputted, the image stabilization control portion 11 proceeds to step SB56. At step SB56, the image stabilization control portion 11 judges whether or not specification of the value of the roll-direction reference angle θ1 has been inputted by the control portion 10. The specification of the value of the roll-direction reference angle θ1 is outputted from the control portion 10 at step S6 as described above.

If judging at step SB56 that the specification of the value of the roll-direction reference angle θ1 has not been inputted, the image stabilization control portion 11 proceeds to step SB57 and sets the value of the reference angle to 0. On the other hand, if judging at step SB56 that the specification of the value of the roll-direction reference angle θ1 has been inputted, the image stabilization control portion 11 proceeds to step SB57 and sets the value of the reference angle to the gravity direction.

Then, at step SB79, the image stabilization control portion 11 sets the angle target value, which is the roll-direction target value for holding the attitude of the image pickup device 3, as the reference angle. Then, proceeding to step SB61, the image stabilization control portion 11 calculates the amount of drive (the amount of correction) R in the roll direction required to cause the attitude of the image pickup device 3 to move to the reference angle. Then, proceeding to step SB62, the image stabilization control portion 11 drives the image stabilization portion 5 with the amount of drive calculated at step SB61 to cause the image pickup device 3 to move to the reference angle.

As described above, the image pickup apparatus 1 of the present embodiment continues to execute the roll-direction image stabilization action during a period from the time (the time T2) of starting exposure of an image picked up the first time in the group of continuously picked-up images (the image I) until time (the time T7) of ending exposure of a last image in the group of continuously picked-up images (the image III). Here, the roll-direction image stabilization action from the time T2 until the time T7 maintains the roll-direction attitude of the image pickup device 3 at horizontality (an attitude without inclination relative to the gravity direction).

For example, in a case of performing continuous image pickup of three images in a state that the image pickup apparatus 1 is held by user's hands as shown in FIG. 13, there may be a case where the image pickup apparatus 1 rotates in the roll direction during a period of the continuous photographing. Even in the case where the image pickup apparatus 1 rotates in the roll direction during the period of continuous photographing as described above, the image pickup apparatus 1 of the present embodiment keeps the attitude of the image pickup device 3 horizontal as shown in FIG. 14.

Therefore, in a group of continuously picked-up images acquired by the image pickup apparatus 1 of the present embodiment, an angle of an object is constant in all images. Therefore, at the time of generating composite image data from a group of continuously picked-up images by the image processing portion 10a, the positioning process for rotating images is not required, and it is possible to execute combination of a plurality of images only by the positioning process for causing images to translationally move along the horizontal and vertical axes.

That is, in the present embodiment, for example, in the camera shake redution photographing, the HDR (high-dynamic-range) photographing, or the depth synthesis photographing (super-resolution photographing) for obtaining composite image data by overlapping the images of the group of continuously picked-up images obtained in the state that the image pickup apparatus 1 is held at a predetermined position, it is possible to reduce the operation load related to the combination process for generating the composite image data. By reducing the operation load related to the combination process, it is possible to realize, for example, improvement of responsiveness of actions of the image pickup apparatus and reduction of power consumption.

(Third Embodiment)

Next, a third embodiment of the present invention will be described. Only points of difference from the first embodiment will be described below. Same reference numerals are given to components similar to those of the first embodiment, and description of the components will be appropriately omitted.

The image pickup apparatus 1 of the present embodiment is different from that of the first embodiment in how to determine the value of the roll-direction reference angle θ1 to be a target value for maintaining the attitude of the image pickup device 3 by the roll-direction image stabilization action.

Figure 17:
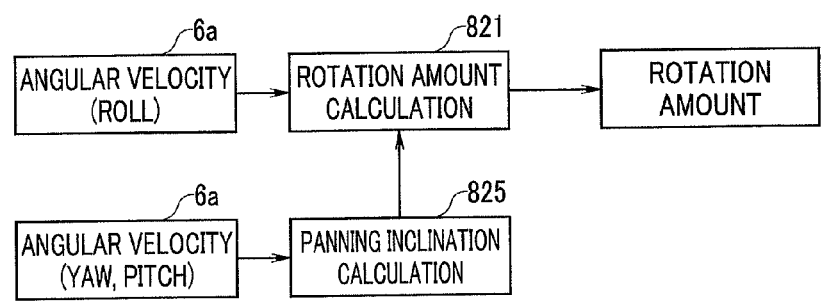
FIG. 17 is a diagram illustrating a configuration of an image stabilization portion of a third embodiment.
Figure 18:
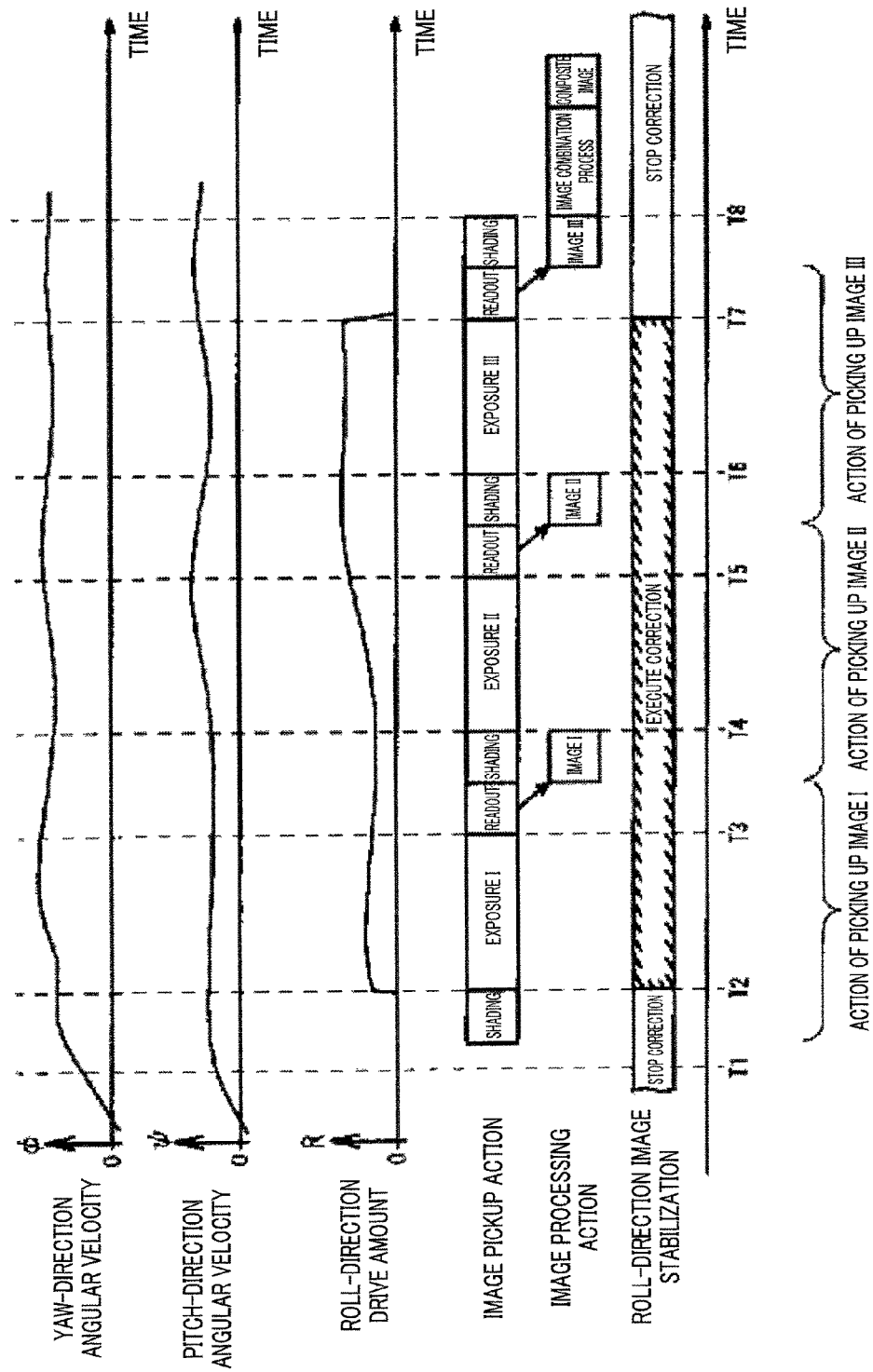
FIG. 18 is a diagram illustrating an action/operation of the image pickup apparatus of the third embodiment acquiring composite image data.

As shown in FIG. 17, the image stabilization control portion 11 of the present embodiment executes palming inclination calculation 825 for calculating inclination of a panning movement direction of the image pickup apparatus 1, based on an output from the three-axis angular velocity sensor 6a of the attitude detection portion 6 in the operation process by the angle blur amount calculation portions. Panning is to cause the image pickup apparatus 1 to rotate around the vertical axis. FIG. 18 schematically shows an action/operation of the image pickup apparatus 1 of the present embodiment acquiring composite image data. FIG. 18 shows an action of the image pickup apparatus 1 acquiring a group of continuously picked-up images constituted by an image I, an image II and an image III obtained by performing continuous image pickup three times and acquiring one piece of composite image data from the group of continuously picked-up images by performing the combination process, as an example.

FIG. 18 shows an example of a timing chart of an action of the image pickup apparatus 1 at the time of acquiring the group of continuously picked-up images to acquire the composite image data, a yaw-direction angular velocity φ and a pitch-direction angular velocity ψ of the image pickup apparatus 1 detected by the attitude detection portion 6, and the amount of drive (the amount of correction) R in the roll direction which the image stabilization control portion 11 outputs to the image stabilization portion 5, with time indicated by a horizontal axis.

Figure 19:
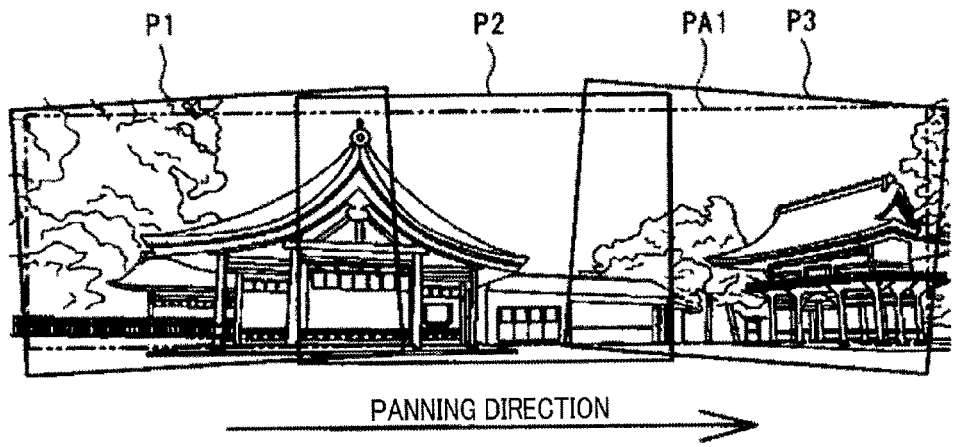
FIG. 19 is a diagram showing a case of performing continuous image pickup without performing an image stabilization action.
Figure 20:
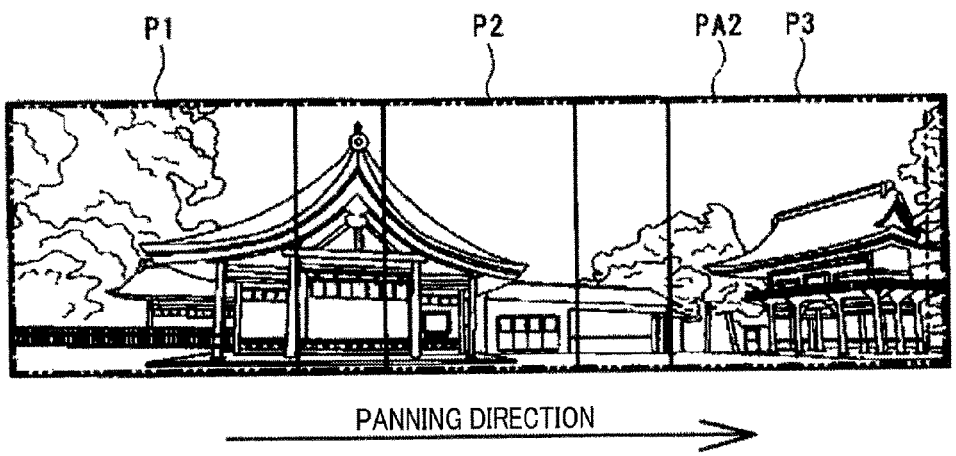
FIG. 20 is a diagram showing a case of performing continuous image pickup while performing the image stabilization action, by the image pickup apparatus of the third embodiment.

Further, FIG. 19 shows a state of panorama photographing for generating one piece of composite image data in which a range wider than an angle of view of the image pickup lens 4a is captured, by connecting three images P1, P2 and P3 continuously picked up while the image pickup apparatus 1 is being panning. FIG. 19 shows a case where the image pickup apparatus 1 rotationally moves in the roll direction during panning. Further, FIG. 20 shows a case where, in a case of performing panorama photographing for a same object as FIG. 19, the image stabilization action by the image stabilization control portion 11 and the image stabilization portion 5 is executed.

Figure 21:
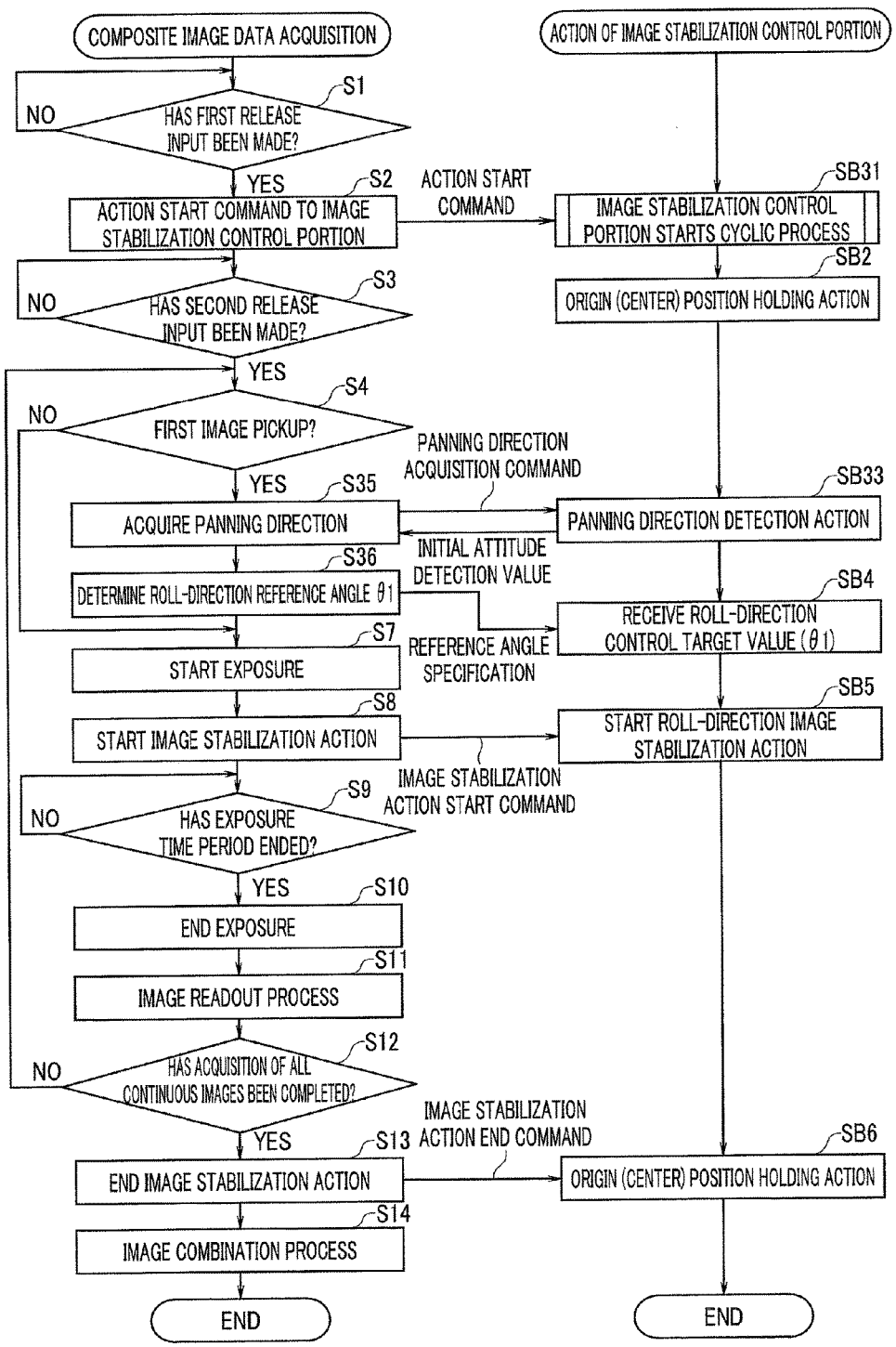
FIG. 21 is a flowchart of an action of the image pickup apparatus of the third embodiment acquiring a group of continuously picked-up images to acquire composite image data.
Figure 22:
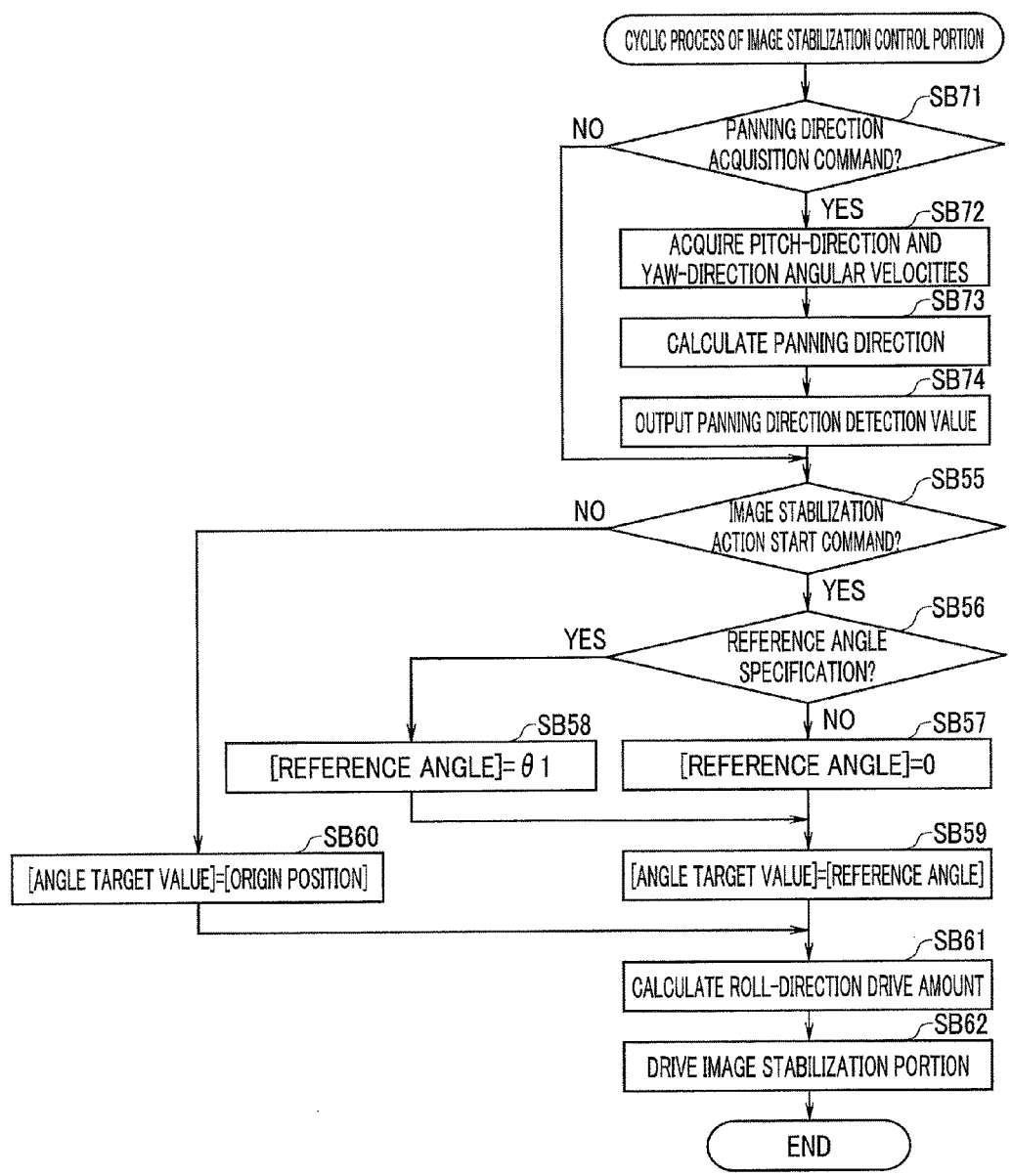
FIG. 22 is a flowchart of a periodic action of an image stabilization control portion of the third embodiment.

FIGS. 21 and 22 are flowcharts of actions of the image pickup apparatus 1 of the present embodiment acquiring a group of continuously picked-up images to acquire composite image data.

As shown in FIG. 21, the control portion 10 waits until the release switch 8b is operated by the user to make the first release input. When the first release input is made, the control portion 10 proceeds to step S2.

At step S2, the control portion 10 outputs an action start command to the image stabilization control portion 11. By executing step S2, the image stabilization control portion 11 starts the cyclic process at step SB31. The cyclic process of the image stabilization control portion 11 will be described later.

After starting the cyclic process of step SB31, the image stabilization control portion 11 drives the image stabilization portion 5 to execute an origin position holding action for holding the image pickup device 3 at the origin position at step SB2. That is, at the time of the first release input, the image pickup device 3 is held at the origin position.

Next, at step S3, the control portion 10 waits until the second release input is made. When the second release input is made, the control portion 10 proceeds to step S4. Note that, for example, if the user causes force to be given to the release switch 8b to disappear, and the first release input disappears without the second release input being made, then the control portion 10 returns to step S1.

At step S4, it is judged whether or not an image pickup action is a first image pickup action among continuous image pickup actions for acquiring a group of continuously picked-up images. In other words, it is judged at step S4 whether the image I in the group of continuously picked-up images has been picked up or not.

If it is judged at step S4 that the image pickup action is the first image pickup action among the continuous image pickup actions, the control portion 10 proceeds to step S35. If it is judged at step S4 that the image pickup action is not the first image pickup action among the continuous image pickup actions, the control portion 10 skips steps S35 and S36 and proceeds to step S7.

At step S35, the control portion 10 acquires information about a panning direction, which is a panning movement direction of the image pickup apparatus 1, from the image stabilization control portion 11. More specifically, at step S35, the control portion 10 outputs a panning direction acquisition command to the image stabilization control portion 11. Receiving the panning direction acquisition command, the image stabilization control portion 11 returns a panning direction, which is information about a panning movement direction of the image pickup apparatus 1 calculated based on a detection result of the attitude detection portion 6, to the control portion 10 (step SB33).

More specifically, as for the panning direction, the image stabilization control portion 11 calculates an integrated value of each of the yaw-direction angular velocity $\varphi$ and the pitch-direction angular velocity $\psi$ detected by the attitude detection portion 6 during a period from the time T1 to the time T2, and acquires yaw-direction and pitch-direction rotation angles of the image pickup apparatus 1 during the period from the time T1 to the time T2. Then, the image stabilization control portion 11 calculates the panning direction from the yaw-direction and pitch-direction rotation angles of the image pickup apparatus 1 during the period from the time T1 to the time T2.

Next, at step S36, the control portion 10 sets the panning direction inputted from the image stabilization control portion 11 at step S35 as a roll-direction reference angle $\theta 1$ and specifies the value of the roll-direction reference angle $\theta 1$ to the image stabilization control portion 11. The image stabilization control portion 11 sets the roll-direction reference angle $\theta 1$ as a target value for maintaining the roll-direction attitude of the image pickup device 3 in an image stabilization action (step SB4).

Since the actions of the control portion 10 at and after step S7 and the actions of the image stabilization control portion 11 at and after step SB5 are similar to those of the first embodiment, description of the actions will be omitted.

The cyclic process of the image stabilization control portion 11 shown in FIG. 22 will be described below.

In the cyclic process, first at step SB71, the image stabilization control portion 11 judges whether a panning direction acquisition command from the control portion 10 has been inputted or not. The panning direction acquisition command is outputted from the control portion 10 at step S35 as described above.

If judging at step SB71 that the panning direction acquisition command has been inputted, the image stabilization control portion 11 executes steps SB72 to SB74 and, after that, executes step SB55. If judging at step SB71 that the panning direction acquisition command has not been inputted, the image stabilization control portion 11 skips steps SB72 to SB74 and executes step SB55.

At steps SB72 to SB74, the image stabilization control portion 11 acquires detection values of the yaw-direction angular velocity $\varphi$ and the pitch-direction angular velocity $\psi$ by the attitude detection portion 6 (step SB72), calculates a panning movement direction of the image pickup apparatus 1 based on the detection values (step SB73), and outputs the values to the control portion 10 as a panning direction (step SB74).

At step SB55, the image stabilization control portion 11 judges whether an image stabilization action start command from the control portion 10 has been inputted or not. The image stabilization action start command is outputted from the control portion 10 at step S8 as described above.

If judging at step SB55 that the image stabilization action start command has not been inputted, the image stabilization control portion 11 proceeds to step S60, and sets an angle target value, which is a roll-direction target value for holding the attitude of the image pickup device 3, as the origin position. Then, proceeding to step SB61, the image stabilization control portion 11 calculates the amount of drive (the amount of correction) R in the roll direction required to cause the attitude of the image pickup device 3 to move to the origin position. Then, the image stabilization control portion 11 proceeds to step SB62 and drives the image stabilization portion 5 with the amount of drive calculated at step SB61 to cause the image pickup device 3 to move to the origin position.

On the other hand, judging at step SB55 that the image stabilization action start command has been inputted, the image stabilization control portion 11 proceeds to step SB56. At step SB56, the image stabilization control portion 11 judges whether or not specification of the value of the roll-direction reference angle θ1 has been inputted by the control portion 10. The specification of the value of the roll-direction reference angle θ1 is outputted from the control portion 10 at step S36 as described above.

If judging at step SB56 that the specification of the value of the roll-direction reference angle θ1 has not been inputted, the image stabilization control portion 11 proceeds to step SB57 and sets the value of the reference angle to 0. On the other hand, if judging at step SB56 that the specification of the value of the roll-direction reference angle θ1 has been inputted, the image stabilization control portion 11 proceeds to step SB57 and sets the value of the reference angle to θ1.

Then, at step SB59, the image stabilization control portion 11 sets the angle target value, which is the roll-direction target value for holding the attitude of the image pickup device 3, as the reference angle. Then, proceeding to step SB61, the image stabilization control portion 11 calculates the amount of drive (the amount of correction) R in the roll direction required to cause the long sides of the external shape of the light receiving surface of the image pickup device 3 to be parallel to the roll-direction reference angle θ1. Then, proceeding to step SB62, the image stabilization control portion 11 drives the image stabilization portion 5 with the amount of drive calculated at step SB61 to cause the image pickup device 3 to move to the reference angle.

As described above, in the case of acquiring a group of continuously picked-up images while panning the image pickup apparatus 1, the image pickup apparatus 1 of the present embodiment continues to execute the roll-direction image stabilization action during the period from the time (the time T2) of starting exposure for an image picked up for the first time (the image I) until the time (the time T7) of ending exposure for a last image in the group of continuously picked-up images (the image 111). Here, the roll-direction image stabilization action from the time T2 until the time T7 maintains the long sides of the external shape of the light receiving surface of the image pickup device 3 parallel to the panning direction (the roll-direction reference angle θ1).

For example, in a case of performing continuous image pickup of three images while panning the image pickup apparatus 1 in a state that the image pickup apparatus 1 is held by user's hands as shown in FIG. 19, there may be a case where the panning direction is not parallel to the long sides of the picked-up three images P1, P2 and P3. In this case, as shown in FIG. 19, a range shown in a panorama image PA1 cut out in a rectangular shape after the images P1, P2 and P3 are connected is small.

In the image pickup apparatus 1 of the present embodiment, since the long sides of the external shape of the image pickup device 3 are kept parallel to a panning direction by continuing to execute the roll-direction image stabilization action during a period of continuous image pickup, the long sides of the acquired images P1, P2 and P3 are parallel to the panning direction as shown in FIG. 20. Therefore, in the present embodiment, since it is possible to use all the images P1, P2 and P3 to generate a panorama image PA2, a range shown in the panorama image PA2 can be widened.

Further, in a group of continuously picked-up images acquired by the image pickup apparatus 1 of the present embodiment, the angle of an object in overlapped visual fields of adjoining images is constant. Therefore, at the time of generating composite image data from a group of continuously picked-up images by the image processing portion 10a, the positioning process for rotating images is not required, and it is possible to execute combination of a plurality of images only by the positioning process for causing images to translationally move along the horizontal and vertical axes.

That is, in the present embodiment, in the panorama photographing in which composite image data is obtained by connecting images of a group of continuously picked-up images obtained by performing image pickup while panning the image pickup apparatus 1, it is possible to reduce the operation load related to the combination process for generating the composite image data. By reducing the operation load related to the combination process, it is possible to realize, for example, improvement of responsiveness of actions of the image pickup apparatus and reduction of power consumption.

(Fourth Embodiment)

Next, a fourth embodiment of the present invention will be described. Only points of difference from the second embodiment will be described below. Same reference numerals are given to components similar to those of the second embodiment, and description of the components will be appropriately omitted.

Figure 23:
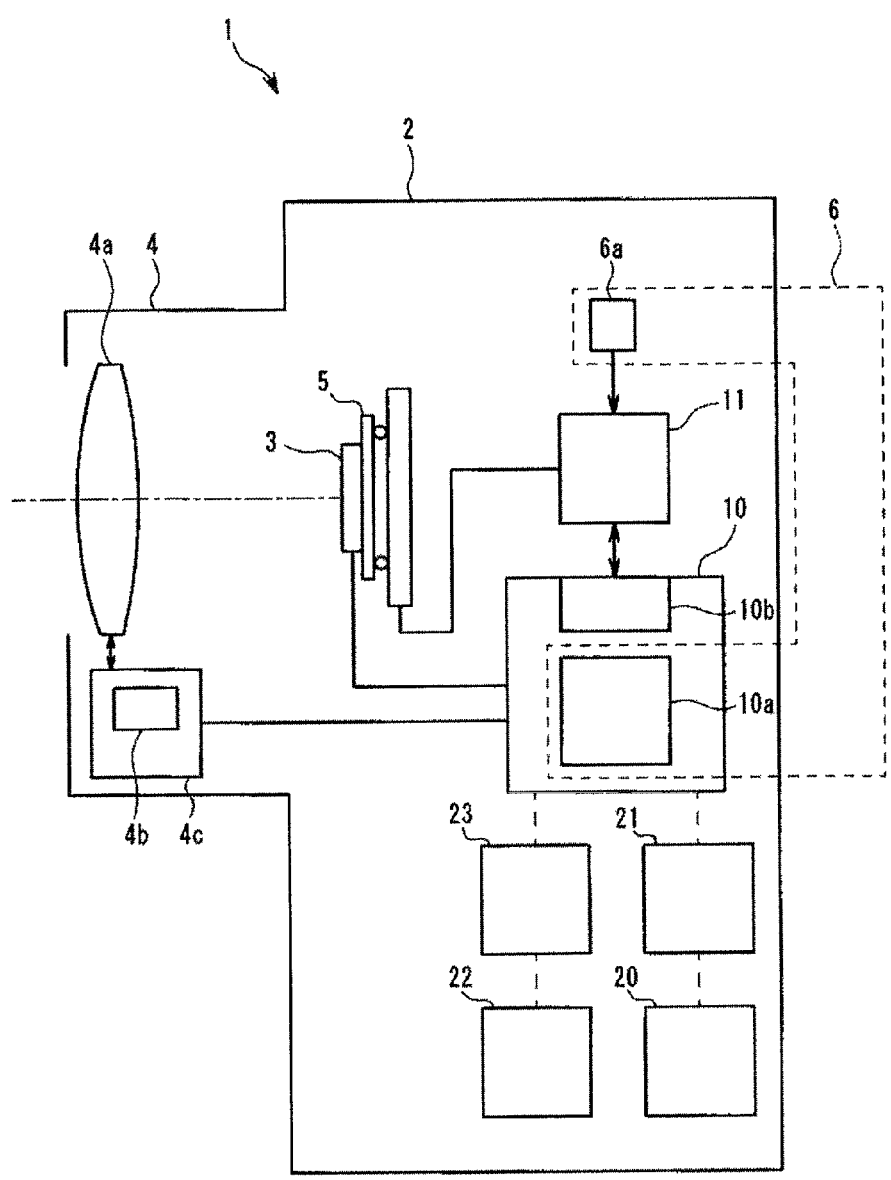
FIG. 23 is a block diagram illustrating a configuration of an image pickup apparatus of a fourth embodiment.

The image pickup apparatus 1 of the present embodiment is different from the second embodiment in a configuration of the attitude detection portion 6. More specifically, the attitude detection portion 6 of the image pickup apparatus 1 of the present embodiment is configured with the three-axis angular velocity sensor 6a and the image processing portion 10a as shown in FIG. 23.

The attitude detection portion 6 of the present embodiment detects an attitude of the image pickup apparatus 1 relative to the gravity direction by recognizing a line estimated to be horizontal or vertical from image data obtained by the image pickup device 3. The line estimated to be horizontal or vertical in the image data is, for example, a horizon, a part of an outline of a building and the like.

Figure 24:
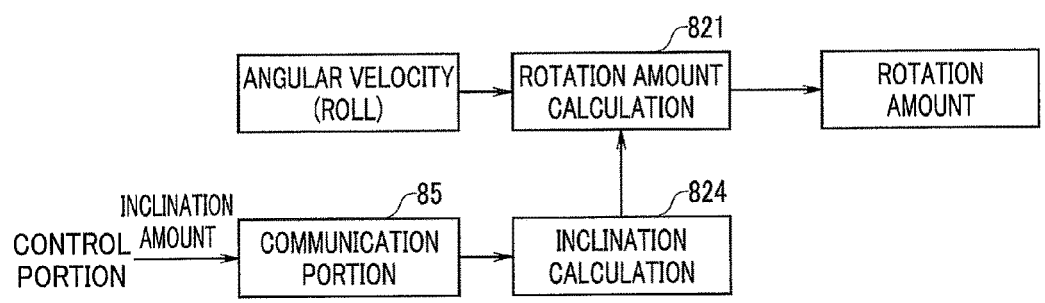
FIG. 24 is a diagram illustrating a configuration of an image stabilization portion of the fourth embodiment.

FIG. 24 is a block diagram showing details of a roll-direction angle blur amount detection portion 82c of the image stabilization control portion 11 in the fourth embodiment. In the present embodiment, the angle blur amount detection portion 82c executes inclination calculation 824 for acquiring an attitude of the image pickup apparatus 1 relative to the gravity direction to calculate inclination of the image pickup device 3 relative to the gravity direction, from the control portion 10 including the image processing portion 10a via the communication portion 85.

Figure 25:
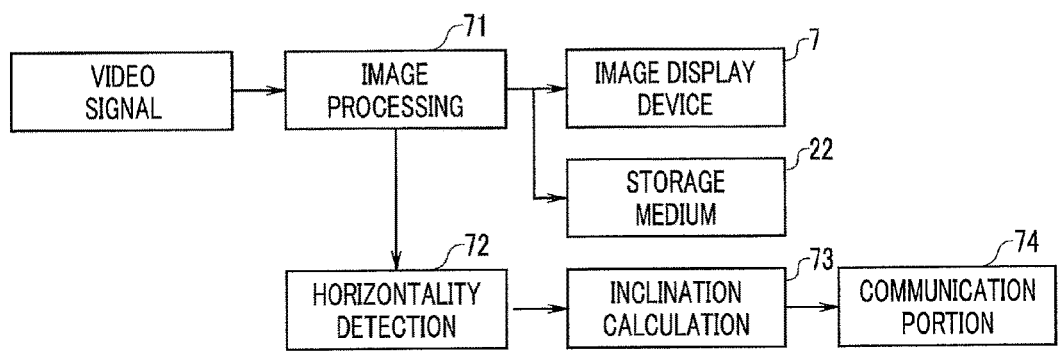
FIG. 25 is a block diagram showing an internal function of a control portion related to an attitude detection portion of the fourth embodiment.

FIG. 25 is a block diagram showing an internal function of the control portion 10 related to the attitude detection portion 6. Though the control portion 10 performs various controls of camera actions, only functions related to the present invention will be described here. The control portion 10 converts a video signal acquired from the image pickup device 3 to a format to be displayed on the image display device 7 or a format to be stored into the storage medium 22 by image processing portion 71.

A horizontality detection portion 72 detects a line estimated to be horizontal or vertical from image data converted by the image processing portion 71 and, if the line is detected, calculates inclination of the image pickup apparatus 1 relative to the gravity direction by inclination calculation portion 73. The calculated inclination is outputted to the image stabilization control portion 11 via a communication portion 74.

In the present embodiment, by realizing a partial configuration of the attitude detection portion 6 by software processing in the image processing portion 10a, it is possible to simplify and inexpensively configure the attitude detection portion 6.

(Fifth Embodiment)

Next, a fifth embodiment of the present invention will be described. Only points of difference from the first to fourth embodiments will be described below. Same reference numerals are given to components similar to those of the first to fourth embodiments, and description of the components will be appropriately omitted.

The image pickup apparatus 1 of the present embodiment is different from the image pickup apparatuses of the first to fourth embodiments described above in a point that the image stabilization portion 5 is not provided with the mechanism configured to cause the image pickup device 3 to relatively move relative to the body portion 2.

Figure 26:
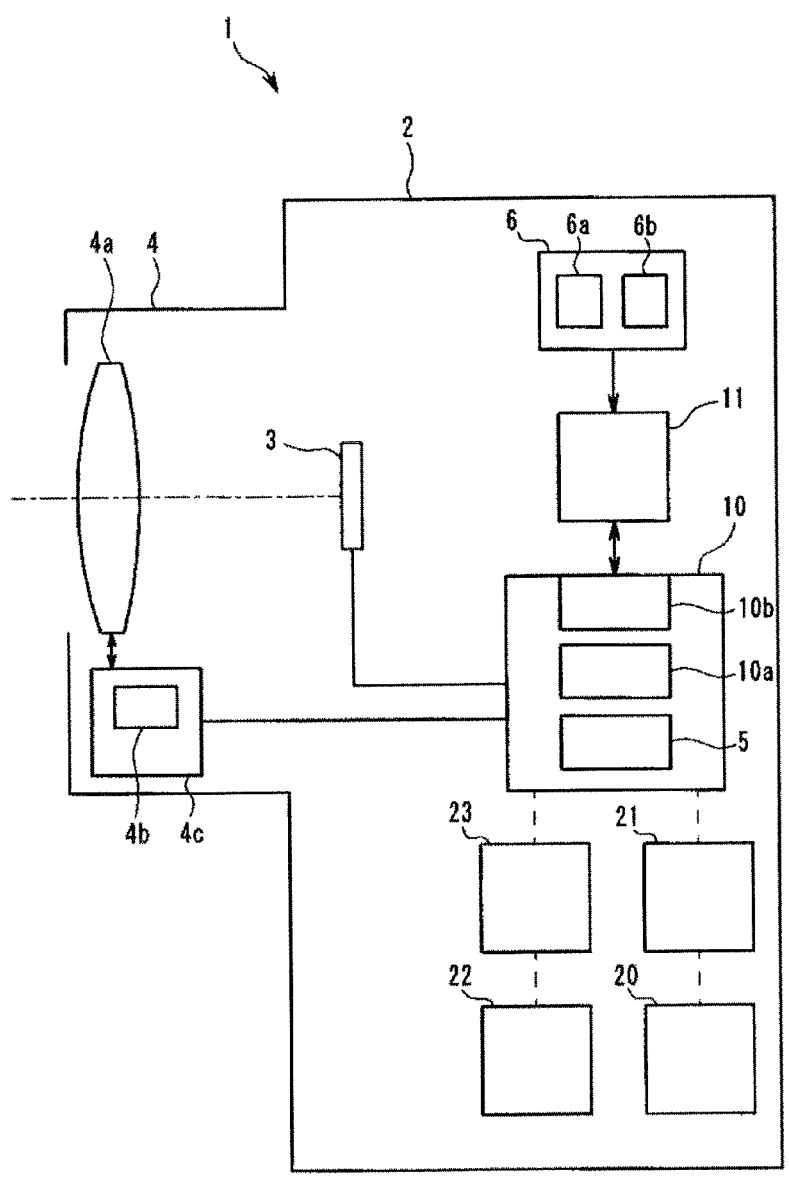
FIG. 26 is a block diagram illustrating a configuration of an image pickup apparatus of a fifth embodiment.

The image stabilization portion 5 of the present embodiment causes a cutout area, which is an area for generating image data, to translationally move or rotationally move on the light receiving surface of the image pickup device 3. That is, as shown in FIG. 26, the image stabilization portion 5 of the present embodiment is included in the control portion 10.

In the present embodiment, the control portion 10 calculates, based on information about a focal distance of the image pickup lens 4a, and information about rotational movement and translational movement of the image pickup apparatus 1 detected by the attitude detection portion 6, an amount of movement of image relative to the light receiving surface of the image pickup device 3 caused by the rotational movement and the translational movement of the image pickup apparatus 1 on the light receiving surface of the image pickup device 3. Then, the control portion 10 causes the cutout area to move in an X-Y direction, which is the translation direction relative to the light receiving surface of the image pickup device 3, and a θ direction, which is a rotation direction in the roll direction so that image movement relative to the light receiving surface during an exposure period of the image pickup device 3 is offset. Such an image stabilization method of the present embodiment is called an electronic-type image stabilization function or the like, and it can be realized in a simple configuration in comparison with an image sensor shift type image stabilization function like that of the image pickup apparatuses of the first to fourth embodiments. Since details of the electronic-type image stabilization function is well known, detailed description will be omitted.

In the image pickup apparatus 1 of the present embodiment also, similarly to the first to fourth embodiments, the positioning process for rotating images is not required at the time of generating composite image data from a group of continuously picked-up images, and it is possible to reduce the operation load related to the combination process for generating composite image data from the group of continuously picked-up images.

Note that the present invention is not limited to the embodiments described above but can be appropriately changed within a range not departing from the spirit or idea of the invention read from the Claims and the whole specification. An image pickup apparatus in which such a change is made is also included in the technical scope of the present invention.

Further, the image pickup apparatus according to the present invention is not limited to the form of a digital camera as described in the embodiments described above but may be in a form of, for example, an electronic apparatus provided with an image pickup function. As the electronic apparatus provided with the image pickup function, for example, a mobile communication terminal, a game machine, a digital media player, a wristwatch, a voice recorder and binocular glasses are conceivable.

What is claimed is:

1. An image pickup apparatus comprising:
an image pickup device arranged on an optical axis of an image pickup lens;
a body portion configured to accommodate the image pickup device;
an attitude detector including a pitch-direction angular velocity sensor that detects an angular velocity of the body portion in a pitch direction, a yaw-direction angular velocity sensor that detects an angular velocity of the body portion in a yaw direction, and a roll-direction angular velocity sensor that detects an angular velocity of the body portion in a roll direction, the pitch direction and the yaw direction being rotation directions around two axes orthogonal to the optical axis, the roll direction being a rotation direction around the optical axis;
a movable image stabilizer configured to hold the image pickup device in a state of being rotatable around the optical axis and correct image blur caused by rotation of the body portion around the optical axis;
an image stabilization circuit configured to calculate an amount of correction for the movable image stabilizer according to a detection result of the attitude detector; and
a system controller including an image processor configured to generate composite image data by connecting a group of continuously picked-up images in a panning direction, the group of continuously picked-up images being constituted by a plurality of pieces of image data continuously picked up by the image pickup device, while the body portion being panned, wherein
the image stabilization circuit calculates an inclination of a panning movement direction based on the detection result of the pitch-direction angular velocity sensor and the yaw-direction angular velocity sensor and drives the movable image stabilizer so that long sides of an external shape of an exposure surface of the image pickup device are parallel to the panning direction until exposure of all the pieces of image data of the group of continuously picked-up images ends.

2. The image pickup apparatus according to claim 1, wherein the image stabilization circuit performs, in a predetermined period before an image pickup of image data to be picked up for a first time of the group of continuously picked-up images, time integration on the angular velocity of the body portion in the pitch direction and the angular velocity of the body portion in the yaw direction that are detected by the pitch-direction angular velocity sensor and the yaw-direction angular velocity sensor, to calculate a rotation angle of the body portion in the pitch direction and a rotation angle of the body portion in the yaw direction in the predetermined period, and
the image stabilization circuit determines the inclination of the panning movement direction based on the rotation angle of the body portion in the pitch direction and the rotation angle of the body portion in the yaw direction, before the image pickup of the image data to be picked up for the first time of the group of continuously picked up images.

* * * * *